United States Patent [19]
Sumiya et al.

[11] Patent Number: 5,315,691
[45] Date of Patent: May 24, 1994

[54] PRINT CONTROL APPARATUS

[75] Inventors: Hiroshi Sumiya, Nagoya; Kousuke Fukaya, Kariya; Sunao Kawai, Nagoya; Hiroyuki Sasaki, Gamagori; Yoshiyuki Ban, Aichi; Ryohei Komiya, Nagoya; Kiyoji Muramatsu, Nagoya, all of Japan

[73] Assignee: Brother Kogyo Kabushiki Kaisha, Aichi, Japan

[21] Appl. No.: 7,968

[22] Filed: Jan. 22, 1993

[30] Foreign Application Priority Data

| Jan. 22, 1992 | [JP] | Japan | 4-009511 |
| Jan. 22, 1992 | [JP] | Japan | 4-009512 |
| Feb. 18, 1992 | [JP] | Japan | 4-030862 |
| Feb. 18, 1992 | [JP] | Japan | 4-030863 |
| Feb. 18, 1992 | [JP] | Japan | 4-030864 |
| Feb. 18, 1992 | [JP] | Japan | 4-030867 |

[51] Int. Cl.$^5$ .................................... G06F 15/00
[52] U.S. Cl. ......................... 395/109; 395/112
[58] Field of Search ............... 395/112, 115, 116, 109, 395/101, 110, 111; 358/462, 467; 382/16-17; 346/154, 157

[56] References Cited

U.S. PATENT DOCUMENTS 5,125,072  6/1992  Ng ........................ 395/112

Primary Examiner—Arthur G. Evans
Attorney, Agent, or Firm—Oliff & Berridge

[57] ABSTRACT

A print control apparatus for use with a printer for forming a print output based on command data generated by a computer. The print control apparatus includes a line segment data conversion unit for converting computer-generated command data to successive pieces of line segment data each having a position and a length in a raster direction, and a raster image data conversion unit for converting the line segment data to raster image data based on which printing is performed by the printer.

15 Claims, 27 Drawing Sheets

Is : BIT IMAGE START POINT
Ie : BIT IMAGE END POINT
Ic : BIT IMAGE ID
Cs : CIRCLE IMAGE START POINT
Ce : CIRCLE IMAGE END POINT
Cc : CIRCLE IMAGE COLOR VALUE
Rs : RECTANGULAR IMAGE START POINT
Re : RECTANGULAR IMAGE END POINT
Rc : RECTANGULAR IMAGE COLOR VALUE

524
TWO-DIMENSIONAL PIXEL INFORMATION (DATA)

FIRST LINE L₂₁

SECOND LINE L₂₂

THIRD LINE L₂₃

FIRST LINE L31

SECOND LINE L32

THIRD LINE L33

| S1001 | START PRINTING |
| S1002 | RASTER IMAGE DATA PRESENT ? |
| S1003 | SUPPLY RASTER IMAGE DATA |
| S1004 | OFF-LINE FOUND ? |
| S1005 | PRINT RESTART PRERARATION PROCESS |

PRINT CONTROL APPARATUS

BACKGROUND OF THE INVENTION

The present invention relates generally to a print control apparatus, and more particularly to improvements in such a print control apparatus which is used in a printer for receiving command data generated by a computer and which develops the computer-generated command data into raster image data.

Conventionally, in a printer of the type concerned, a data space or capacity which is the equivalent of a one-page amount of two-dimensional raster image data to be printed is allocated on a semiconductor storage device (internal memory) of a print control apparatus provided in the printer. In the print control apparatus, command data such as character codes supplied from a computer are developed into raster image data, and are stored on the allocated storage area. The term "raster image data" is used herein to refer to image data (bit data) to be supplied to the printer for instructing the printer to plot individual picture elements or pixels to form each line (raster) extending along a print width. When the raster image data developing process has been completed to produce the raster image data for all the rasters of one page of print output and store the raster image data in the semiconductor storage device, a print mechanism of the printer is started and the developed raster image data are outputted to the print mechanism. Thus, the print mechanism prints one page as a unit.

However, a great improvement made in resent years on the resolution and picture quality of the printers has brought about a remarkable increase in the amount of the raster image data contained in one page. With this increased data size, the cost of the necessary semiconductor storage device and the entire equipment cost have increased considerably. Furthermore, due to various limitations involved in power consumption and electric drivability of semiconductors, and a maximum data size processable in a central processing unit (CPU), it has become practically impossible to manufacture a satisfactorily operable printer. In addition, when a large-sized printout is desired, a larger capacity semiconductor storage device must be provided.

Further, much longer time is spent in developing the raster image data onto such a large semiconductor storage device (memory). For instance, when a print output of size A4 is to be printed, if each pixel requires 1 bit data as in a conventional black-and-white laser printer and if the resolution of the desired print output is up to 12 pixel/mm, a 1 megabyte of semiconductor storage device is required. However, an A0-size printout with resolution of 12 pixel/mm and 24 bits/pixel (16,700,000 color/pixel) requires at least 500 megabytes of memory. This will result in an extremely increased equipment cost and much longer developing time which will make it difficult to produce a practically usable printing apparatus.

SUMMARY OF THE INVENTION

With the foregoing drawbacks of the prior art in view, it is an object of the present invention to provide a print control apparatus or controller which is able to reduce the amount of semiconductor storage devices used and is capable of printing a large-sized print output at high speeds with high resolution and high picture quality.

To attain the foregoing object, the present invention provides in one aspect a print control apparatus for converting command data representative of at least one desired image to be printed by a printer device onto one page of print output into raster image data representative of color density data to be printed on respective ones of a plurality of rasters in the one page of print output, the print control apparatus comprising: input means for receiving command data representative of at least one desired image to be printed by a printer device onto one page of print output; line segment data conversion means for converting the command data into at least one line segment data allotted for each raster of a plurality of rasters in the print output, each of the at least one line segment data representing a line segment image which extends in the corresponding raster and which has a single color distribution corresponding to the at least one desired image to be printed and bearing information on a position and a length, in a direction in which the corresponding raster extends, of the line segment image and a state of the single color distribution of the line segment image; raster image data conversion means for converting the at least one line segment data to a raster image data representative of color density data to be printed on the corresponding raster in the one page of print output; and output means for outputting the raster image data for respective one of the plurality of rasters to a printer device one by one, to thereby allow the printer device to print the plurality of rasters one by one and produce the one page of print output.

It is noted that in the case where the desired image represented by the command data has, on some raster, at least a part where at least a color is distributed in a single state or manner, the at least one part on the raster of the desired image is referred to as the line segment image. Accordingly, in the line segment image, at least a color is distributed in the single state or manner. The line segment image extends in the corresponding raster and is of a line-shape. For example, the line segment image may be an image having a single color. The line segment image may be an image where at least two colors are distributed in a single distribution state. Illustrative examples of the line segment image include a hatching image where oblique lines are presented to be arranged in a single manner or a cross-hatching image where two groups of lines are arranged to cross in a single manner. The line segment data therefore represents a range in a corresponding raster to be occupied by a part of the desired image (line segment image) where at least a color is distributed in a single state or manner. The line segment data also represents the content (color state) of the desired image.

The print control apparatus further comprises: line segment data storage means for temporarily storing the line segment data for all of the plurality of rasters before when the raster image data conversion means converts the line segment data for respective one of the plurality of rasters one by one.

The raster image conversion means includes: judge means for judging the information on the position and the length in the raster extending direction of each of the at least one line segment data allotted for each raster to thereby determine which one of the line segment images represented by the line segment data occupies each point on the corresponding raster; and conversion means for converting the line segment data representative of the line segment image occupying the corresponding point in the corresponding raster into the raster image data for the corresponding point in the corresponding raster. The judge means includes overlapping judging means for judging whether or not at least two line segment images represented by at least two line segment data occupy the corresponding point on the corresponding raster, and wherein said conversion means includes conversion selection means for converting only a single one of the at least two line segment data representative of one of the corresponding at least two line segment images which is overlapped on remaining ones of the at least two line segment images at the corresponding point in the corresponding raster into the raster image data for the corresponding point in the corresponding raster.

The line segment data storage means includes: line segment data dividing means for dividing a plurality of line segment data produced by the line segment data conversion means into a first group consisting of at least one of the plurality of line segment data and a second group consisting of remaining at least one of the plurality of line segment data; a first storage unit for storing the first group of the line segment data; a second storage unit for storing the second group of the line segment data, said second storage unit having at least one sector for storing therein the second group of the line segment data, each of the at least one sector having a predetermined sector size; and data size conversion means for converting size of the second group of the line segment data into an integral multiple of the predetermined sector size before when the second group of the line segment data is stored in the second storage unit.

The print control apparatus further comprises printer status input means for receiving a signal indicative of a status of the printer device. In this case, the line segment data storage means includes: first line segment data storage means for temporarily storing the line segment data for respective ones of the plurality of rasters on the print output until when said printer status input means receives the signal; second line segment data storage means for temporarily storing the line segment data for the respective ones of the plurality of rasters on the print output after when the printer status input means receives the signal; and transfer means for transferring the line segment data for the respective ones of the plurality of rasters on the print output from the first line segment data storage means toward the second line segment data storage means at the time when the printer status input means receives the signal. The printer status input means receives a signal indicative of stop of a printing operation of the printer device, and the first line segment data storage means includes a volatile memory and the second line segment data storage means includes a non-volatile memory.

According to another aspect, the present invention provides a print control apparatus for converting command data representative of at least one desired image to be printed by a printer device onto one page of print output into raster image data representative of color density data to be printed on respective ones of a plurality of rasters in the one page of print output, the print control apparatus comprising: input means for receiving command data representative of at least one desired image to be printed by a printer device onto one page of print output; command data kind judging means for judging whether the command data received by the input means is either one of a graphic image command data representative of a graphic image where color is distributed in a single manner and a bit image command data representative of a bit image where a plurality of color pixels representative of various colors are distributed, the graphic image command data bearing an information on the single manner in which the color is distributed and the bit image command data bearing an information on the state how the plurality of color pixels are distributed; first conversion means for converting the graphic image command data into at least one first line segment data allotted for each raster of a plurality of rasters in the print output, each of the at least one first line segment data representing a first line segment image where at least one color is distributed in the single manner, the first line segment image extending in the corresponding raster, the first line segment data bearing information on a position and a length, in a direction in which the corresponding raster extends, of the first line segment image and the single manner in which the at least one color is distributed in the first line segment image; second conversion means for converting the bit image command data into a bit image information data bearing information on the state how the color pixels are distributed in the bit image and at least one second line segment data allotted for each raster of a plurality of rasters in the print output, each of the at least one second line segment data representing a second line segment image where the plural color pixels are distributed in the state represented by the bit image information data, the second line segment image extending in the corresponding raster, the second line segment data bearing information on a position and a length, in a direction in which the corresponding raster extends, of the second line segment image, the second line segment data and the bit image information data serving, in cooperation, to represent the second line segment image; raster image data conversion means for processing the first line segment data for each raster to produce a first raster image data and processing the second line segment data for the corresponding raster and the bit image information data to thereby produce a second raster image data, combining the first raster image data and the second raster image data into a raster image data for the corresponding raster which represents a color density data to be printed on the corresponding raster in the one page of print output: and output means for outputting the raster image data for respective one of the plurality of rasters to a printer device one by one, to thereby allow the printer device to print the plurality of rasters one by one and produce the one page of print output.

It is noted that in the graphic image represented by the graphic image command data, at least a color is distributed in a single state or manner. For example, the graphic image may be an image of a shape (e.g., a rectangular shape, a circular shape, etc.) having a single color. The graphic image may also be an image of a shape in which at least two colors are distributed in a single distribution manner. Illustrative examples of the graphic image of this type include a hatching image of circular shape in which oblique lines are presented or a crosshatching image of a rectangular shape in which two groups of lines are arranged to cross. The first line segment image for each raster is a part of the graphic image positioned on the corresponding raster. Accordingly, in the first line segment image, at least a color is distributed in a single state or manner represented by the graphic image command data. For example, in the case where the graphic image has a single color, the first line segment image is an image having a single color. In the case where at least two colors are distributed in a single manner in the graphic image, the first line segment image is an image where the at least two colors are distributed in the single distribution state. Illustrative examples of the first line segment image therefore include a hatching image where oblique lines are presented or a crosshatching image where two groups of lines are arranged to cross. To summarize, the first line segment data represents a range in a corresponding raster which is to be occupied by the graphic image and the content (color state) of the graphic image.

It is also noted that in the bit image represented by the bit image command data, a plurality of color pixels are distributed in various manners. For example, the bit image may be a digital image obtained by picking up a photographic image through an image reader or an image scanner. The bit image information data has information on the state how the color pixels are distributed in the bit image. That is, the bit image information data has information on the content (color state) of the bit image. The second line segment image for each raster is a part of the bit image positioned on the corresponding raster. The second line segment data therefore represents a range in the corresponding raster to be occupied by the bit image.

The print control apparatus may further comprises: bit image converting means for subjecting the bit image information data to an image conversion process to thereby produce a bit image data. In this case, the raster image conversion means processes the second line segment data and the bit image data for converting the second line segment data and the bit image data to the second raster image data. The bit image command data received by the input means includes information on the image conversion process. In this case, the second conversion means produces the bit image information data having the information on the image conversion process, and the bit image converting means subjects the bit image information data to the image conversion process corresponding to the information on the image conversion process to thereby produce the bit image data.

According to further aspect, the present invention provides a print system for printing at least one desired image on one page of print output, comprising: command data producing means for producing command data representative of at least one desired image to be printed onto one page of print output; command data processing means for processing the command data into raster image data representative of color density data to be printed on respective one of a plurality of rasters in the one page of print output; and printing means for printing respective one of a plurality of rasters in the one page of print output based on the raster image data. The command data processing means includes: line segment data conversion means for converting the command data into at least one line segment data allotted for each raster of a plurality of rasters in the print output, each of the at least one line segment data representing a line segment image of a single color distribution which extends in the corresponding raster and bearing information on a position and a length, in a direction in which the corresponding raster extends, of the line segment image and the single color distribution of the line segment image; and raster image data conversion means for converting the at least one line segment data to the raster image data.

Many other objects, advantages and features of the present invention will be better understood from the following description taken in conjunction with the accompanying drawings.

DETAILED DESCRIPTION OF THE PREFERRED EMBODIMENTS

Figure 1:
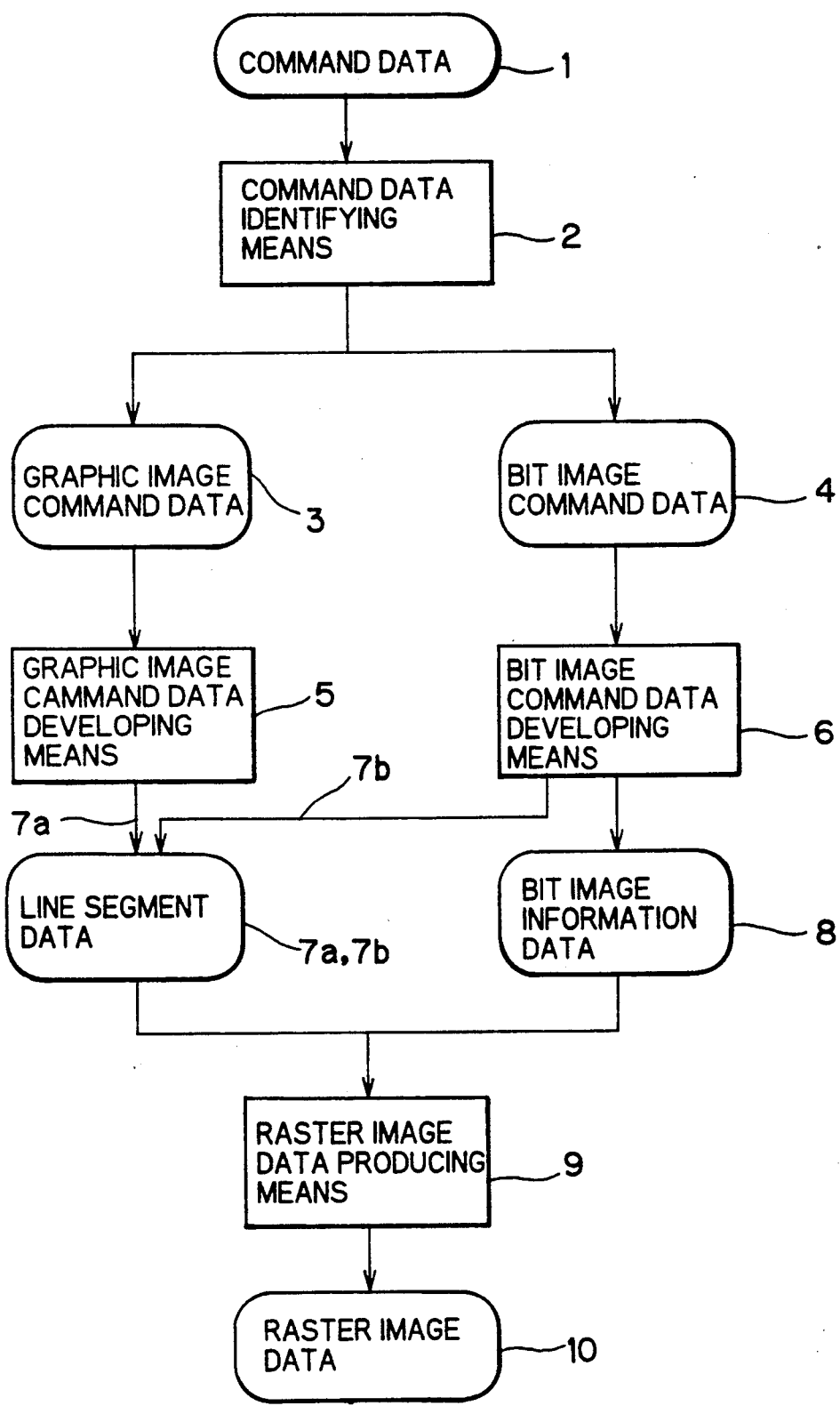
FIG. 1 is a functional block diagram of a first embodiment of the present invention.

A print control apparatus of the present invention is provided for converting command data, generated by a computer, to raster image data printable on a printer. The print control apparatus comprises a line segment data conversion part for converting the computer-generated command data to successive pieces of line segment data each having information on a position and a length in a raster direction; and a raster image data conversion part for converting the successive pieces of line segment data to raster image data.

The print control apparatus may further include a storage part for storing the successive pieces of line segment data. The line segment data conversion part stores the successive pieces of line segment data in the storage part while converting the computer-generated command data to the successive pieces of line segment data, and the raster image data conversion part converts the line segment data stored in the storage part to the raster image data. Based on the raster image data, printing is performed by the printer.

Preferably, the raster image data conversion part has a construction such that when the line segment data converted by the line segment data conversion part includes at least two pieces of line segment data that are overlapping together, the raster image data conversion part converts only one of the two pieces of line segment data. More specifically, the successive pieces of the line segment data are entered to be stored in the storage part one by one in a sequence, and the raster image data conversion part retrieves the successive pieces of line segment data from the storage part one by one in the reverse sequence of entry, then converts the successive pieces of line segment data to the raster image data. If two adjacent ones of the successive pieces of line segment data partly or entirely overlap together, the raster image data conversion part converts only one of the two adjacent pieces of line segment data which comes first.

The storage part may include an internal storage unit and an external storage unit both for storing the line segment data. The internal storage unit and the external storage unit are operationally linked such that the successive pieces of line segment data are first stored in the internal storage device, and if the amount of the successive pieces of line segment data is large and exceeds the capacity of the internal storage unit, a part of the successive pieces of line segment data which consists of a plurality of the line segment data (which will be referred to as a "line segment data group") is transferred to the external storage unit. In this case, the raster image data conversion part is operatively connected with both the internal and external storage units for retrieving the line segment data from the internal and external storage units and converting the line segment data to the raster image data.

The external storage unit has a plurality of sectors for storing therein the line segment data, and can perform random access operation to desired ones of the sectors. Each of the sectors therefore serves as a minimum allocation unit for reading and writing operations of the external storage unit. Each of the sectors has a predetermined sector size. Accordingly, the print control apparatus preferably further include a data size conversion part for converting the size of the line segment data group to be transferred to the external storage unit to an integral multiple of the sector size of the external storage unit (product of an integer and the sector size). The data size conversion part converts the data size of the line segment data group before when the line segment data group is transferred to the external storage unit. Accordingly, access to the external storage unit (i.e., the reading and writing operation for the line segment data group) can be achieved on the sector size basis. Thus, a high-speed access to the external storage unit becomes possible.

The print control apparatus may further have a signal generation part for generating an electric signal representing an off-line state of the printer, and a part, responsive to the electric signal, for transferring the content of the internal storage unit (which is formed of a volatile memory) to the external storage unit (which is formed of a non-volatile memory). This arrangement enables the printer to restart its printing operation even if it is reset due to power failure, for example.

A print control apparatus provided in accordance with another aspect of this invention includes a command data identifying part for identifying the command data as graphic image command data or as bit image command data. Based on the graphic image command data identified by the command data identifying part, a graphic image command developing part generates first line segment information data composed of line segment data converted from the graphic image command data and having information on a position and a length in a raster direction, and an image flag added to the line segment data which indicates that the line segment data is produced from the graphic image command data. On the other hand, based on the bit image command data identified by the command data identifying means, a bit image developing part generates (1) second line segment information data composed of line segment data converted from the bit image command data and having information on a position and a length in a raster direction, an image flag added to the line segment data which indicates that the line segment data is produced from the bit image command data, and an image identifier added to the line segment data for managing the bit image command data, and (2) bit image information data including at least a plotting position of an output bit image, and two-dimensionally (vertically and horizontally) arranged pixel data. A raster image data generation part is provided for generating the raster image data based on the first and second line segment data and the bit image information data.

With this construction, the second line segment information data including the image management information and the bit image information data containing image pixel data are generated separately. They are combined to form the raster image data.

The bit image developing part may further generate image conversion information specifying a desired image conversion process, such as scaling, to be applied to the bit image information data. In this case, the print control apparatus further include an image conversion part for converting the bit image information data to raster bit image data according to the image conversion information. The raster image data generation means generates the raster image data, based on the first and second line segment data and the raster bit image data. With the image conversion part thus provided, various processing techniques of the computer graphics can be reproduced by the printer.

A first embodiment of the print control apparatus according to the present invention will now be described by way of example and with reference to the accompanying drawings, in which FIG. 1 is a functional block diagram showing a raster image data generating operation of the print control apparatus.

As shown in FIG. 1, command data 1 representing an image to be printed on one page of print output supplied to the print controller from an external device such as an external computer are first identified as a graphic command data 3 or as a bit image command data 4 by means of a command data identifying means 2. A graphic developing means 5 develops the graphic image command data 3 to produce first line segment data 7a which represents a single line segment image of a single color to be printed in one line (raster) of a print output and which contains data of a position, length, and the color of the line segment image and image information such as an "OFF" image flag representative of the kind of the first line segment data (graphic image). An image developing means 6 develops the bit image command data 4 to produce both second line segment data 7b which represents a single line segment image of a single bit image to be printed in one line (raster) and which contains data of a position, length and color of the line segment image and image information such as an "ON" image flag representative of the kind of the second line segment data (bit image) and an image identifier (ID) managing the bit image command data and bit image information data 8 which represents the details of the bit image represented by the bit image command data 4 which contains data of two-dimensionally (longitudinally and transversely) arranged image picture element data. The first line segment data 7a and the second line segment data 7b are temporarily stored in a storing means in the print controller. A raster image data generating means 9 generates raster image data 10 based on the first line segment data 7a, the second line segment data 7b and the bit image information data 8, one line by one line, and temporarily stores the raster image data in a storing means which are then transferred into the printer device.

Figure 2:
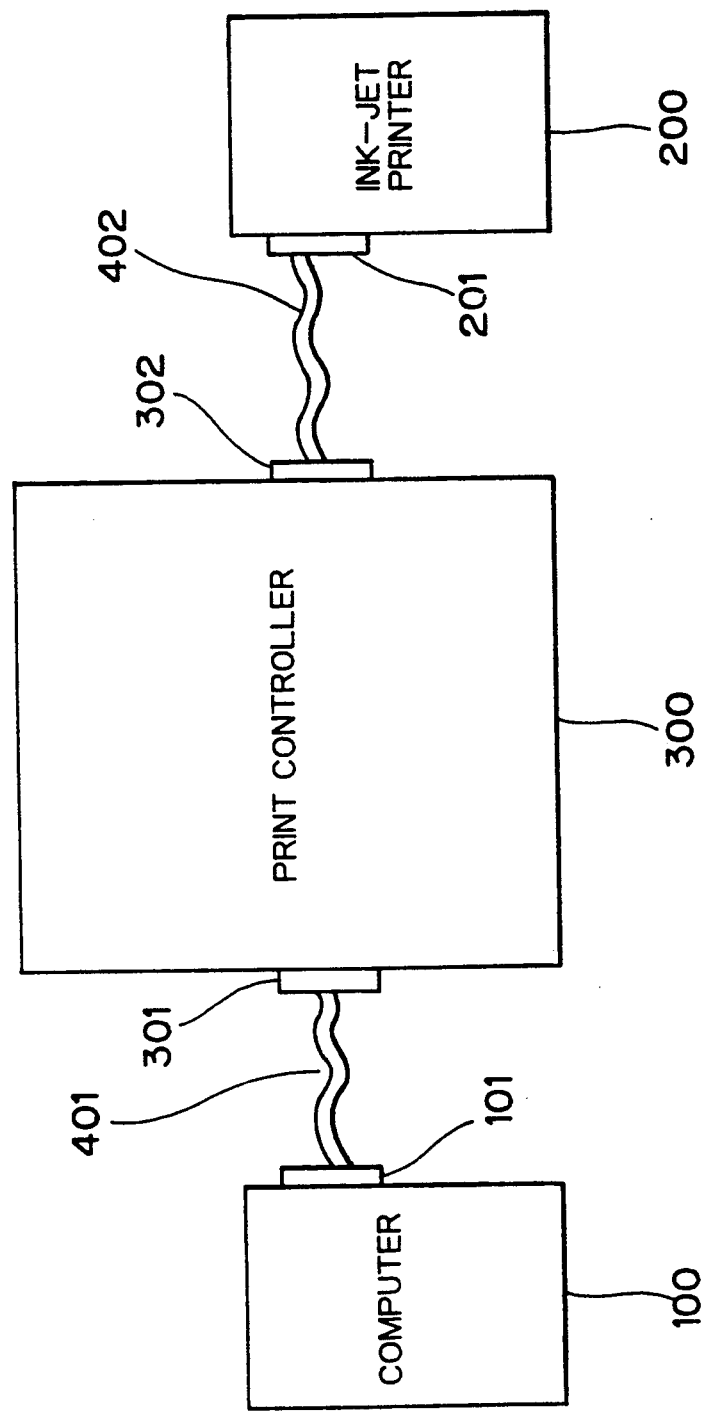
FIG. 2 is a diagrammatical view showing the external connection between a print control apparatus and related equipment in the first and second embodiments of the invention.

FIG. 2 diagrammatically illustrates external connections of the print control apparatus according to the present invention.

As shown in FIG. 2, an external connector 101 of an external host computer 100 is connected to a first interface connector 301 of a print controller 300 of the present invention via a first cable 401 so that the computer 100 and the print controller 300 can exchange command signals and command data therebetween. Similarly, a second interface connector 302 of the print controller 300 is connected to an interface connector 201 of an ink-jet printer 200 via a second cable 402 so that raster image data for each line of print output are successively supplied from the print controller 300 to the ink-jet printer 200.

The construction of the print controller 300 will be described in greater detail with reference to FIG. 3.

Figure 3:
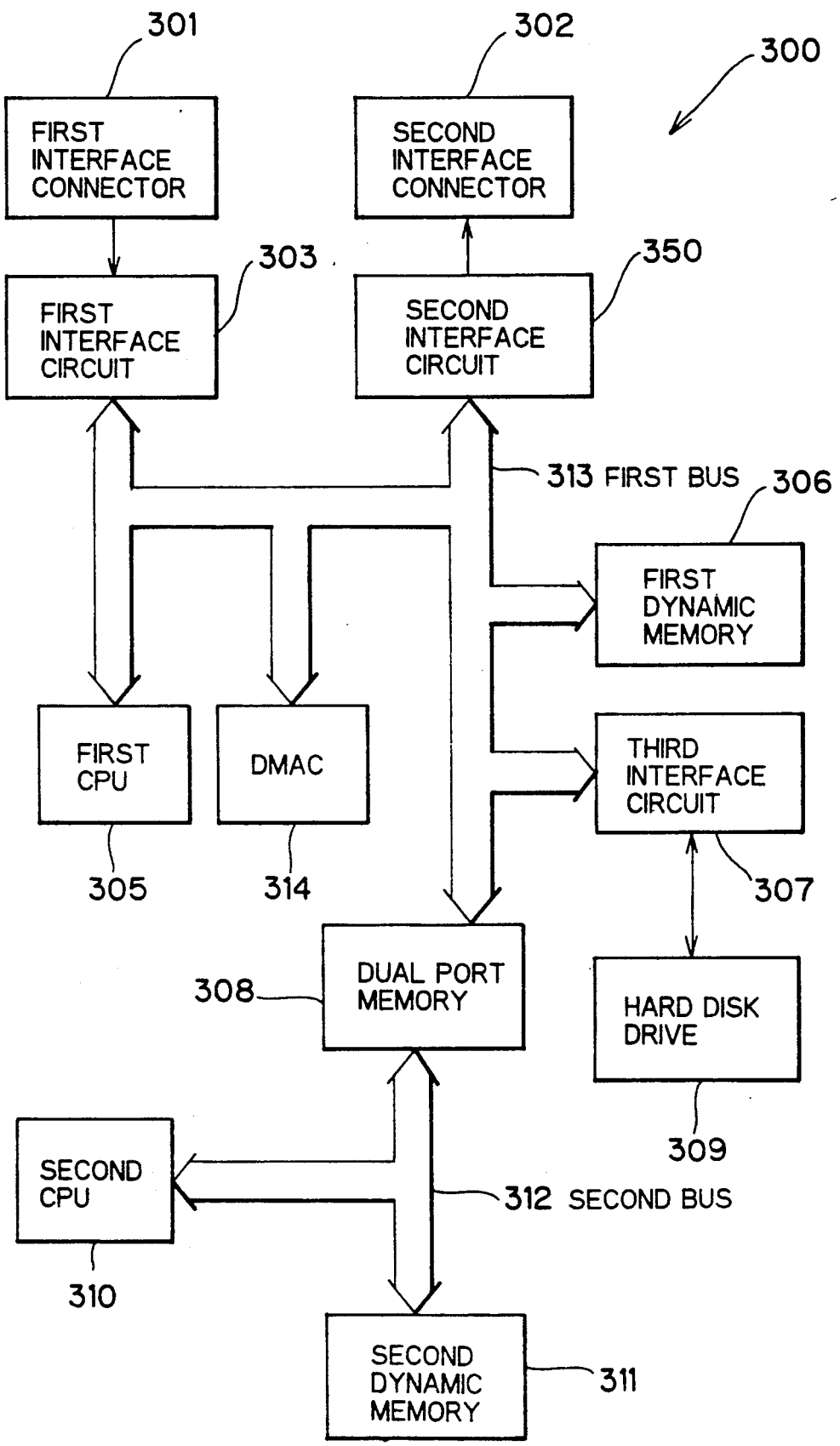
FIG. 3 is a block diagram of the print control apparatus shown in FIG. 2.

As shown in FIG. 3, the first interface connector 301 of the print controller 300 is connected to a first interface circuit 303 so that the command signal and the command data supplied from the computer 100 (FIG. 2) to the first interface connector 301 are received by the first interface circuit 303. Similarly, the second interface connector 302 of the print controller 300 is connected to a second interface circuit 350 to enable the latter to transmit the command signals and the raster image data through the second interface connector 302 to the ink-jet printer 200 (FIG. 2). The first and second interface circuits 303, 350 are connected at their opposite ends to a first bus 313 for permitting exchange of signals and data between these interface circuits 303, 350 and a first central processing unit (CPU) 305. The first bus 313 is also connected to a first dynamic memory 306 for storing data therein, a third interface circuit 307 undertaking interface with an external storage unit such as a hard disk drive 309, a first port of a dual port memory 308 which has two ports and permits access from both ports to the same memory cell for communication between a second CPU 310 described later, and a direct memory access controller (DMAC) 314 for achieving a direct memory transfer between related devices.

The second CPU 310 has a second bus 312 to which are connected a second port of the dual port memory 308 and a second dynamic memory 311 for storing data therein. The hard disk drive 309 has programs stored therein for operating a command executing part 402 (command data interpreting or developing part 401 and a data size converting part 408) and a raster image data producing part 407 described later in conjunction with FIG. 6). The programs are transferred from the hard disk drive 309 to the second dynamic memory 311 when operation of the print controller starts. In FIG. 3, various control signals including an address bus signal, a chip select signal and the like are not shown.

Figure 4:
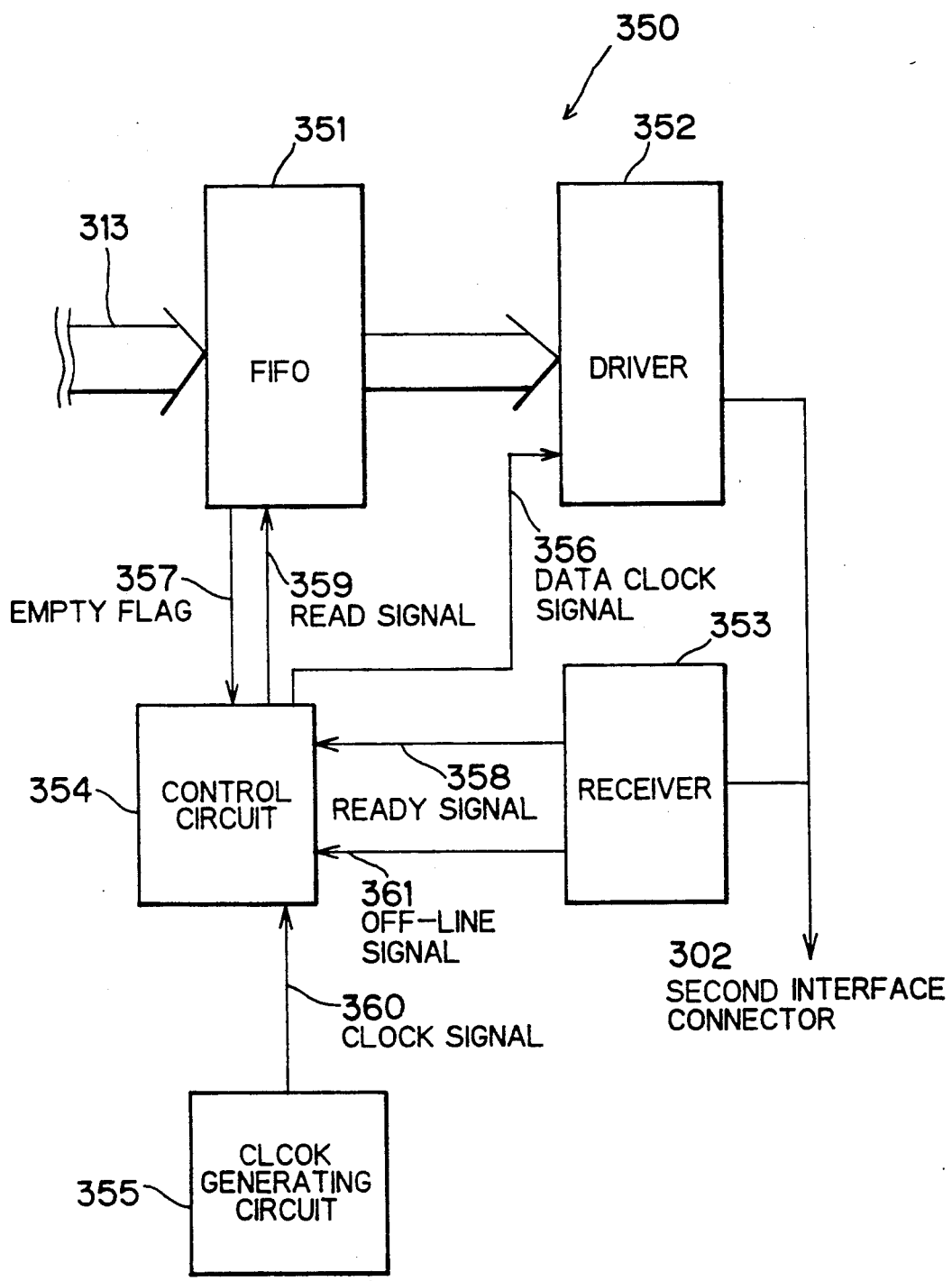
FIG. 4 is a block diagram showing a interface control circuit shown in FIG. 3.

Referring now to FIG. 4, there is shown the structural details of the second interface circuit 350 in the print controller 300.

As shown in FIG. 4, a data input end of a first-in-first-out memory (hereinafter referred to as "FIFO") 351 is connected to the first bus 313 so that data from the first CPU 305 can be written to the FIFO 351. The data output end of the FIFO 351 is connected to a driver 352 which outputs data to the second interface connector 302. A receiver 353 is provided in order to receive a ready signal and an off-line signal supplied from the ink-jet printer 200 via the second interface connector 302 and input these signals to a control circuit 354 as indicated by the arrows 358 and 361. The off-line signal 361 is read from an input port (not shown) to the first CPU 305. The control circuit 354 generates a read signal 359 which is supplied to the FIFO 351, and a data clock signal 356 which is outputted via the driver 352 to the second interface connector 302. Timing of the operation of the control circuit 354 is controlled by a clock signal 360 generated by a clock generation circuit 355. An empty flag 357 of the FIFO 351 is inputted to the control circuit 354.

The construction of the ink-jet printer 200 will be described in greater detail with reference to FIG. 5.

Figure 5:
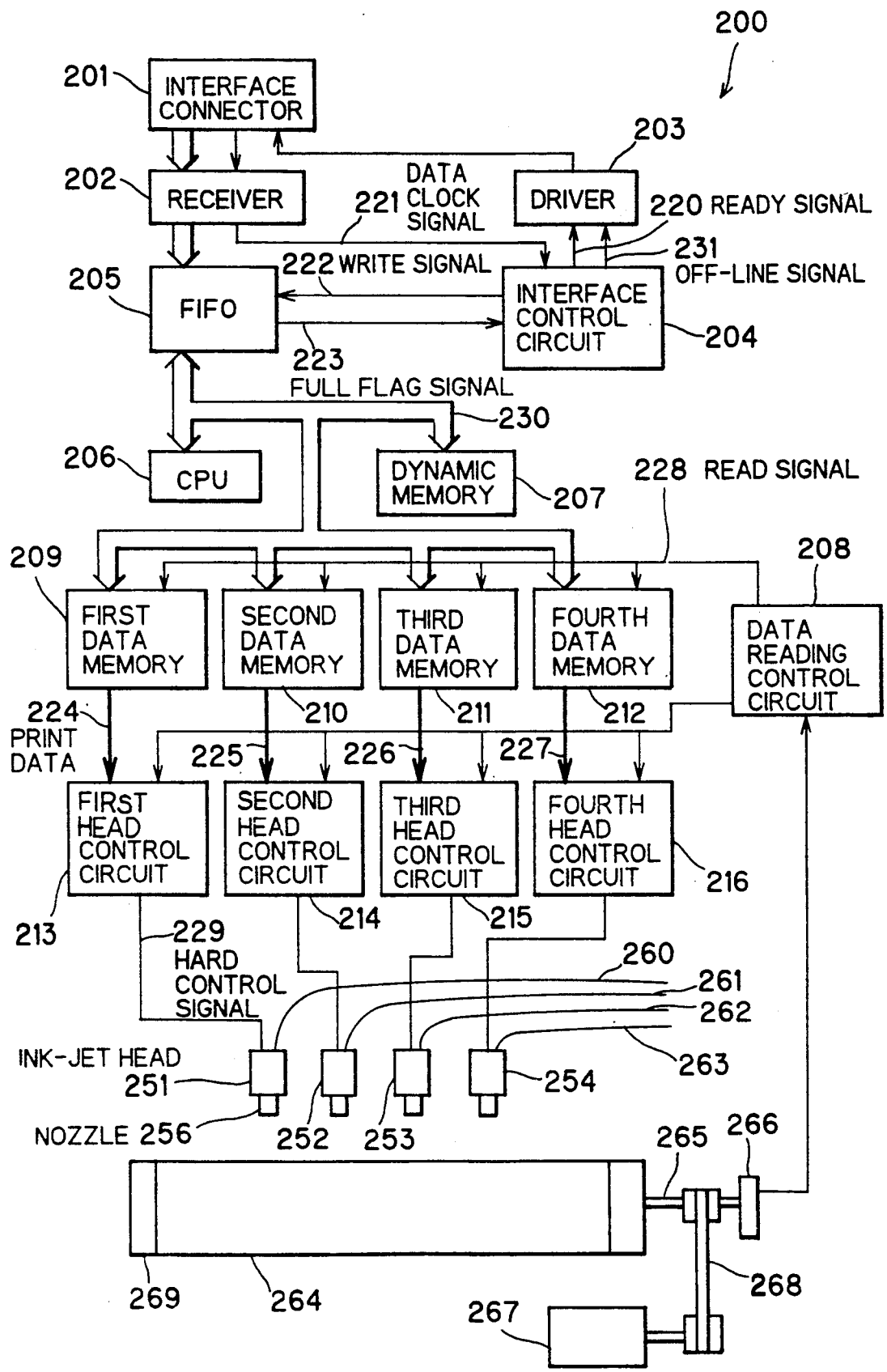
FIG. 5 is a block diagram showing the internal structure of an ink-jet printer.

As shown in FIG. 5, the interface connector 201 is connected to a receiver 202. The receiver 202 inputs input data and a data clock signal 221 respectively to a data input end of an FIFO 205 and an interface control circuit 204. The interface connector 201 is also connected to a driver 203 so that a ready signal 220 generated by the interface control circuit 204 and an off-line signal 231 generated when a CPU 206 accesses to an output port (not shown) are outputted from the driver 203 to the interface connector 201. In order to prevent the FIFO 205 from overflowing, a full flag signal 223 of the FIFO 205 is supplied to the interface control circuit 204. A write signal 222 is supplied from the interface control circuit 204 to the FIFO 205 to write date to the FIFO 205.

The data output end of the FIFO 205 is connected to a bus 230 so that the CPU 206 can read data from the FIFO 205. The bus 230 is also connected to a dynamic memory 207 and to first, second, third and fourth memories 209, 210, 211 and 212. The dynamic memory 207 is used for storing data, while the first, second, third and fourth memories 209, 210, 211 and 212 are used to store the raster image data described later. With the bus 230 thus connected, it is possible to exchange data between the interconnected devices. A data output end of the first data memory 209 is connected to a first head control circuit 213 for delivering the raster image data 224 to the first head control circuit 213. A read signal 228 is supplied from a data readout control circuit 208 to the first data memory 209 for controlling the data reading process. The first head control circuit 213 produces a head control signal 229 based on the raster image data and supplies it to a first ink-jet head 251 for controlling an amount of ink ejected from a nozzle 256 of the first ink-jet head 251. The first ink-jet head 251 is connected to a first pipe 260 through which an ink is supplied from an ink pump (not shown) to the first ink-jet head 251. The second, third and fourth data memories 210, 211 and 212 are connected to the related parts in the same manner as the first data memory 209 described above and, hence, a further description will be omitted. The first, second, third and fourth ink-jet heads 251, 252, 253 and 254, respectively, are supplied with inks of four different colors such as black, yellow, magenta and cyan that are fed through the corresponding pipes 260, 261, 262 and 263.

The four ink-jet heads 251-254 are disposed in confrontation with a drum 269 on which a paper sheet 264 is wound. The drum 269 is rotatable about a shaft 265, and an encoder 266 is connected to the shaft 265 for sending a timing signal to the data readout control circuit 208. The shaft 265 is connected by an endless belt 268 to a motor 267 so that a rotary motion of the motor 267 is transmitted via the belt 268 to the shaft 265. The four ink-jet heads 251-254 are disposed on a single bed (not shown) and movable as a single unit in a direction parallel to a longitudinal axis of the drum 269.

A sequence of operations of the print controller 300 will be described with reference to FIGS. 1 through 10.

When the first CPU 305 (FIG. 3) receives from the computer 100 a command data group consisting of the plurality of command data for one page of print output to be printed, it first places the command data group into the hard disk drive 309. In this instance, since the command data group is received without interpretation, the computer 100 is relieved from a communication task earlier than conventional. In addition, since the command data group is stored in the hard disk drive 309, it is possible to reduce the capacity of the first dynamic memory 306.

When the command data group from the computer 100 (FIG. 2) is entirely inputted, the first CPU 305 writes to the dual port memory 308 a command or instruction that instructs the second CPU 310 to interpret or develop the command data group.

Upon receipt of the instruction, the second CPU 310 writes to the dual port memory 308 a command or instruction that instructs the first CPU 305 to read the command data group from the hard disk drive 309 and write them to the dual port memory 308.

Thereafter, the command data group read or retrieved from the hard disk drive 309 are written to the dual port memory 308 whereupon the second CPU 310 retrieves the command data group from the dual port memory 308 and interprets or develops the command data group to produce the line segment data 7a, 7b and the bit image information data 8. The line segment data 7a and 7b are then stored in the second dynamic memory 311 (and the hard drive disk 309), and the bit image information data 8 are stored in the hard drive disk 309, as will be described later.

A procedure of the above-mentioned interpretation and development will be described in greater detail with reference to FIGS. 6 through 13.

Figure 6:
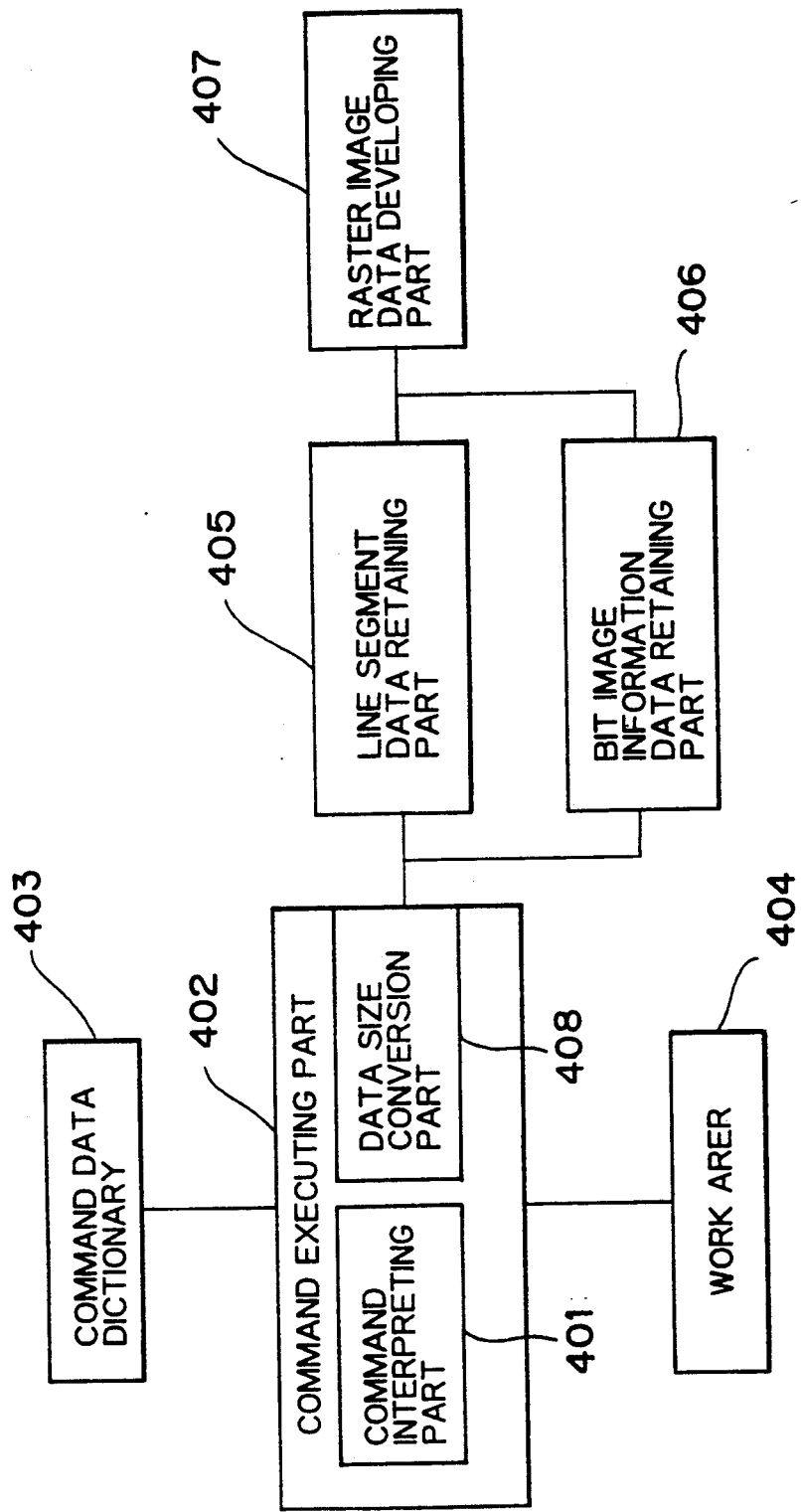
FIG. 6 is a functional block diagram showing a procedure achieved in the first embodiment to interpret and develop the command data group into the line segment data and the bit image information data, and convert the line segment data and the bit image information data to the raster image data.

FIG. 6 is a functional block diagram illustrative of the manner in which the plural command data in the command data group are interpreted successively and subsequently developed to the line segment data and the bit image information data which will be developed into the raster image data.

It is noted that a program for the interpretation and development procedure has been stored in the hard disk drive 309 (FIG. 3). When the first CPU 305 is driven based on a instruction supplied from the external host computer 100 (FIG. 2), the interpretation and development procedure stored in the hard disk drive 309 is retrieved by the third interface circuit 307 and written or loaded to the dual port memory 308. The interpretation and development procedure is then written to the second dynamic memory 311 and is interpreted by the second CPU 310 before when the command data group is transferred to the dual port memory 308 as described above.

More specifically, as shown in FIG. 6, a command executing part 402 including a command interpreting part 401 for interpreting the command data to develop it into the line segment data 7a, 7b and the bit image information data 8 and a data size converting part 408 for changing a size of the line segment data 7a, 7b, a command dictionary part 403, a raster image data developing part 407 for developing the data 7a, 7b and 8 into the raster image data shown in FIG. 6 have been stored in the hard disk drive 309. When the print control apparatus is started, these parts 402 (401, 408), 403, and 407 are transferred to the second dynamic memory 311 (FIG. 3), as described above. The parts 402 (401, 408), 403, and 407 are then executed in succession by the second CPU 310. In this instance, the command interpreting part 401 separates the command data group, coming from the dual port memory 308, into individual command data, and the command dictionary part 403 checks the command data to determine whether or not the command data are right commands. In a work area 404, each of the separated command data is interpreted under the control of the command executing part 402 to produce the line segment data (7a, 7b) and the bit image information data (8). A line segment data retaining part 405 for retaining or storing therein the line segment data 7a and 7b is formed by the second dynamic memory 311 and the hard disk drive 309. More specifically, a line segment data buffer 515 (FIG. 9) described later is reserved in the second dynamic memory 311, and a line segment data auxiliary buffer 517 is reserved in the hard disk drive 309. A bit image information retaining or storing part 406 for retaining therein the bit image information data 8 is formed in the hard disk drive 309. The data size converting part 408 is adapted to convert a data size of a line segment group consisting of a plurality of a line segment data 7a, 7b to be stored in the buffer 517 in the hard disk drive 309 into an integral multiple of a sector size of the hard disk drive 309 (product of an integer and the sector size), where the sector size is a minimum allocation unit for data reading and writing operation of the hard disk unit 309.

The command data supplied from the computer 100 to the print controller 300 includes graphic image command data which represents a graphic image of a figure of a single color such as a straight line, a circle and the like, and bit image command data which are digital image data obtained through scanning a picture, a photoprint and the like using an image scanner.

Accordingly, with the above-described structure, the command data group written to the dual port memory 308 are first separated into individual command data by the command interpreting part 401 in the command executing part 402 and then checked by the command dictionary 403 as to whether they are right command data or not. The command executing part 402 then identifies the command data as a graphic image command data or a bit image command data. The command executing part 402 uses the work area 404 of the second dynamic memory 311 as a temporary buffer. The graphic image control data is then developed to be converted into a plurality of line segment data 7a each piece of which contains information on a length, position and color of a corresponding line segment image. The thus converted line segment data 7a is stored in the line segment data storing part 405. In the case of the bit image data, on the other hand, only position information of the bit image command data is developed to be converted into a plurality of line segment data 7a each piece of which has information on a length, position and color of a corresponding line segment image which is also stored in the line segment data storing part 405, while image pixel information of the bit image command data is converted into a bit image information data 8 and is stored in the bit image information data storing part 406. Each sort of the stored data will be developed into raster image data by the raster image data developing part 407 which will be described later.

Figure 7A:
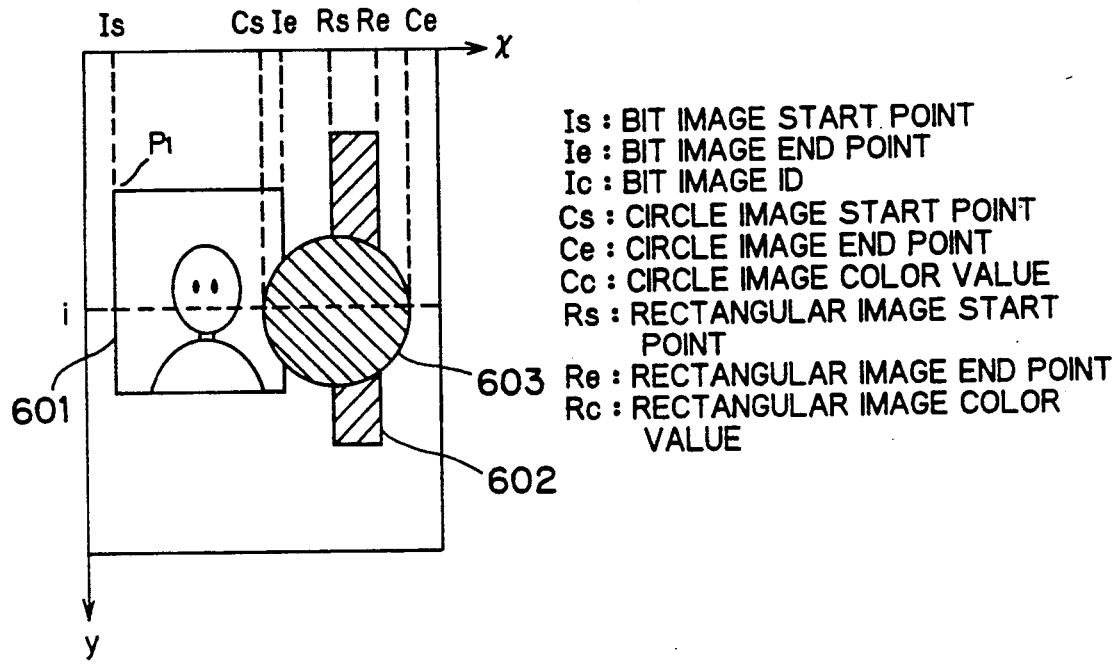
FIGS. 7A and 7B are diagrammatical views showing a sequential relation of images represented by a sequence of the command data and a sequential relation of line segment data produced from the sequence of the command data, according to the present invention.
Figure 7B:
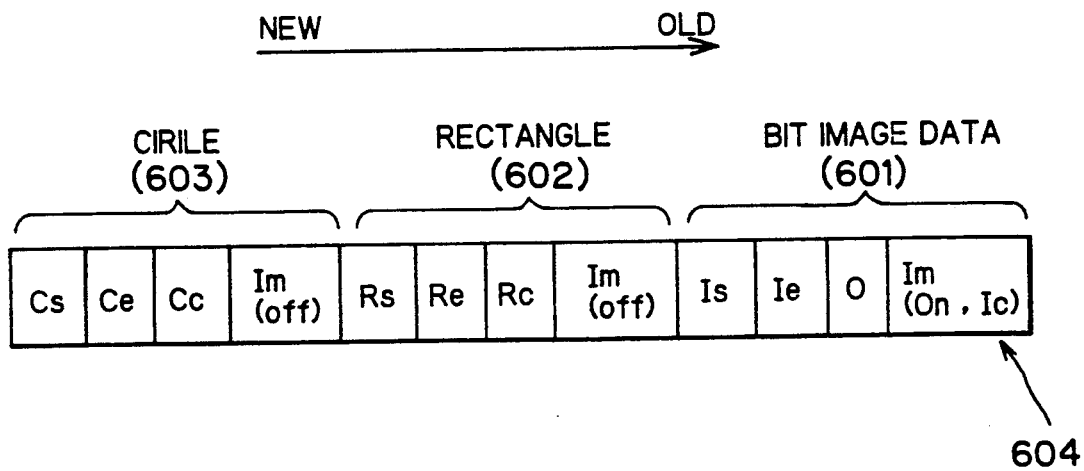

FIGS. 7A and 7B illustrates the manner in which the command data are interpreted successively to be converted into the line segment data 7a, 7b.

Now assume that as shown in FIG. 7A, the command data group includes a bit image command data 601, a rectangle graphic image command data 602 and a circle graphic image command data 603 arranged in the order in which they are generated. It is noted that a latterly generated figure is written over a priorly generated figure and the underlying figure cannot be seen through the overlying figure. In the figure, reference character Is represents an image start point of the bit image 601 for a given raster i, Ie an image end point of the bit image 601 for the given raster i, and Ic an image ID indicating the order of appearance of individual pieces of the bit image command data. Likewise, reference character Cs represents a start point of the circle 603, Ce an end point of the circle 603, and Cc a color value of the circle. In addition, reference character Rs represents a start point of the rectangle 602, Re an end point of the rectangle 602, and Rc a color value of the rectangle 602.

FIG. 7B shows line segment data 604 (7a, 7b) obtained through developing the above-mentioned command data 601, 602, 603 which are taken on the given raster i (FIG. 7A). In the case of graphic image command data as exemplified by the circle 603, all of the successive dots located between the start point Cs and the end point Ce have the same color value of Cc. The line-shaped image part in the given raster i ranging from the point Cs to the point Ce having the single color value Cc is referred to as a line segment image for the circle 603 at the raster i. Similarly in the case of graphic image command data as exemplified by the rectangle 602, all of the successive dots located between the start point Rs and the end point Re have the same color value of Rc. The lineshaped image part ranging from the point Rs to the point Re is therefore the line segment image for the rectangle 602 for the raster i. Accordingly, if the graphic image command data 603 is converted into a single piece of line segment data 604 consisting of only data of the start point Cs, the end point Ce, and the color value Cc, and the rectangle graphic image command data 602 is converted into a single piece of line segment data 604 consisting of only the data Rs, Re, and Rc, and if the thus produced line segment data 604 are stored in the dynamic memory 311, a substantial reduction of the storage capacity can be attained.

On the other hand, in the case of the bit image command data 601, successive dots (picture elements) rarely have the same color value. This means that conversion of the bit image command data to the line segment data results in an enlargement of the data size to be stored. With this difficulty in view, according to the present embodiment, each of the line segment data 604 includes not only the data of the start point, end point, and the color value but also an image management information data IM (represented by 514 in FIG. 9) including an image flag and an image ID so that only a position information regarding the position of the line segment image and the image management information may be recorded as the line segment data. The image flag represents a kind of the command data. That is, when the command data is the graphic image command data, the image flag is "OFF". When the command data is the bit image command data, on the other hand, the image flag is "ON". The image ID is included in the management information data IM only where the command data is the bit image command data. Accordingly, as shown in FIG. 7B, the line segment data 604 for the circle 603 includes the data Cs, Ce, Cc and IM (image flag of "OFF"), and the line segment data 604 for the rectangle 602 includes the data Rs, Re, Rc and IM (image flag of "OFF"). On the other hand, the line segment data 604 for the bit image 601 includes Is, Ie, 0 and IM (image flag of "ON" and ID number). The line segment data 604 for the bit image 601 therefore represents a line segment image ranging from the point Is to the point Ie at the given raster and having a color value of 0. The color state of the line segment image for the bit image 601 is represented by a bit image information data 8 which is also produced from the bit image command data 601. As shown in FIG. 10, the bit image information data 8 includes coordinates 521 of an upper left corner of the bit image 601 (that is indicated by Pl shown in FIG. 7), values of a width and a length of an area within which pixels of the image are arranged, and data of the thus two-dimensionally arranged pixels 524.

While the line segment data 7a, 7b for the graphic image command data and the bit image command data are retained in the line segment data retaining part 405 reserved in the semiconductor storage device (second dynamic memory 311) (and an external storage unit (hard drive disk 309), the bit image information data 8 for the bit image command data is retained separately in the bit image information retaining part 406 reserved in the external storage unit (hard disk drive 309). With this separate storing, the graphic image command data and the bit image command data are retained efficiently. In addition, since no special process is needed for the bit image command data until the raster image data developing process begins, a process simplification can be attained.

Furthermore, if the figure represented by the command data is enlarged n times in vertical and horizontal directions, the conventional system equipped with a storage device of one-page capacity must have a memory size which is $n^2$ times the original memory size. In the system of the present invention, however, an increase in the necessary memory size is limited to n times which are equivalent to an increase in the number of rasters (horizontal scanning lines). More specifically, if the figure 603 is enlarged n times, such a line segment data will be produced as includes data of Cs', Ce', Cc, IM ("OFF") where a value of difference between the data of Cs' and Ce' is product of n and a value of difference between the Cs and Ce. Accordingly, the data amount of the line segment data is unchanged.

The manner of developing the command data into the line segment data and the bit image information data will be described in more detail with referring to illustrative examples for the command data, hereinafter.

Figure 8:
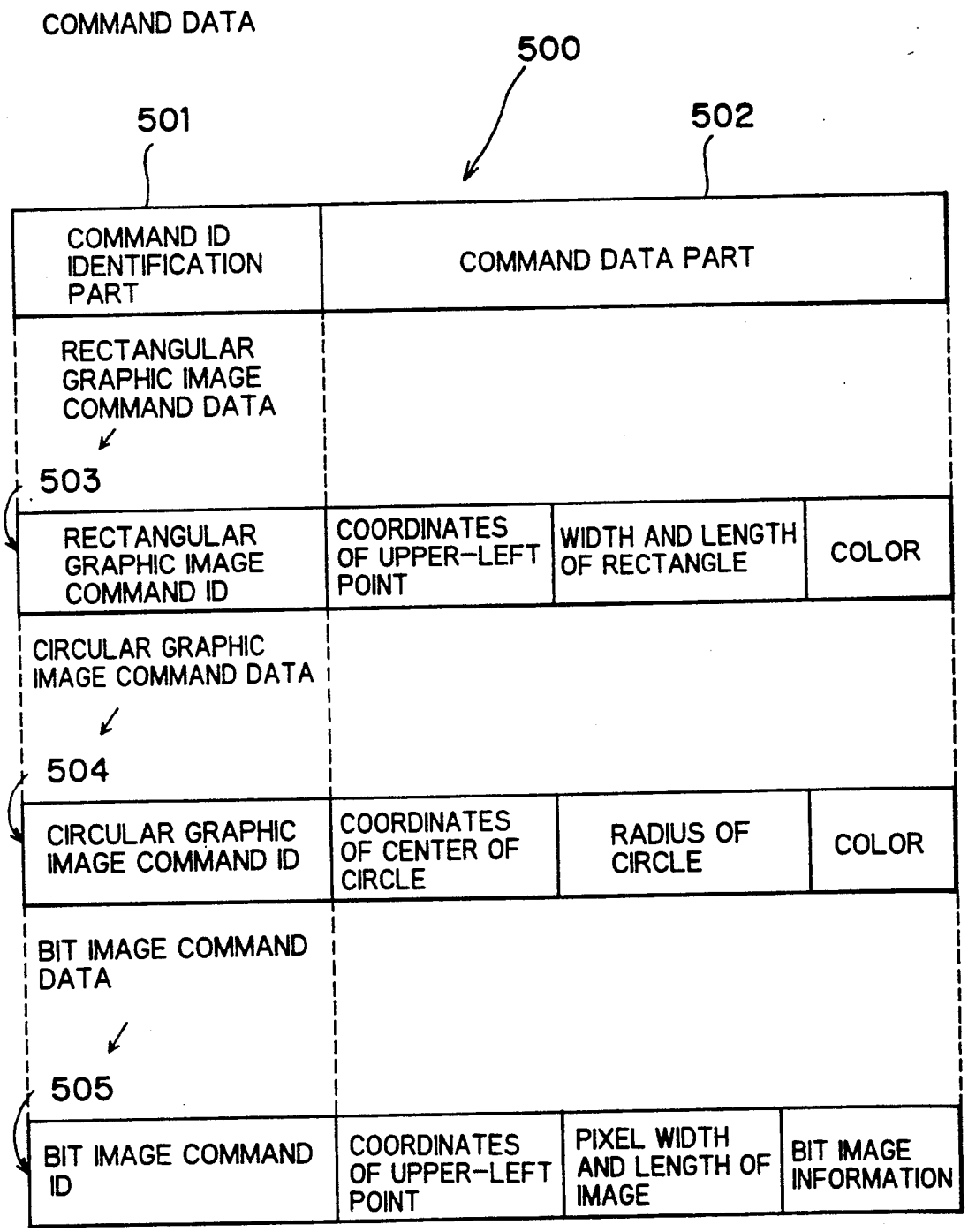
FIG. 8 is a diagrammatical view showing the structure of command data used in the first embodiment of the present invention.

FIG. 8 illustrates the examples 500 of the command data.

An illustrative example of the command data 500 is composed of a command ID identifying part 501 for identifying a command ID indicative of the order of appearance of the command data and a command data part 502 forming the content of the command data. An example of the rectangle graphic image command data 503 is composed of a rectangle graphic image command ID, coordinates of an upper left corner of the rectangle, a width and a length of the rectangle, and a color of the rectangle. An example of the circle graphic image command data 504 is composed of a circle graphic image command ID, coordinates of the center of the circle, radius of the circle, and a color of the circle.

An example of the bit image command data 505 is composed of an image command ID, coordinates of an upper left corner of the image, a width and a length of the image, and pixel (bit) information of the image. In this illustration, the command data identifying means 2 (FIG. 1) identifies the graphic image command data 3 (503, 504) or the bit image command data 4 (504) by checking the command IDs of the respective command data.

Figure 9:
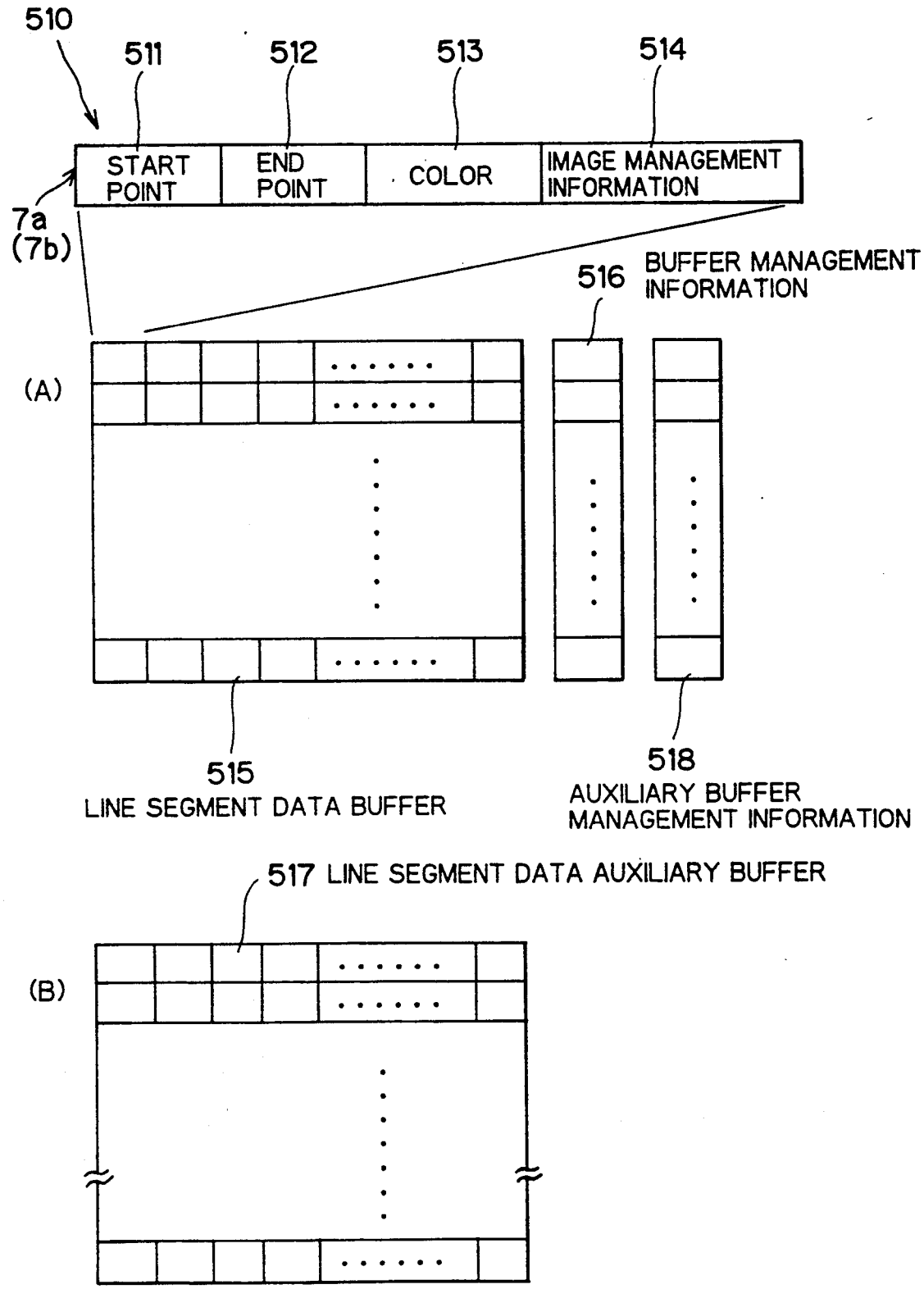
FIGS. 9A and 9B is a diagrammatical view showing the structure of line segment data used in first and second embodiments of the present invention.
Figure 10:
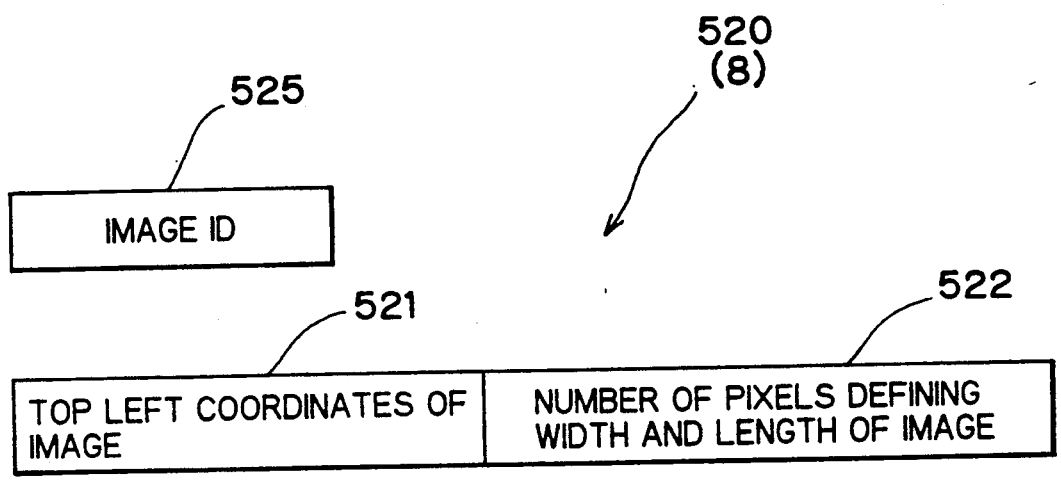
FIG. 10 is a diagrammatical view showing the structure of bit image information data used in the first embodiment of the present invention.
Figure 10:
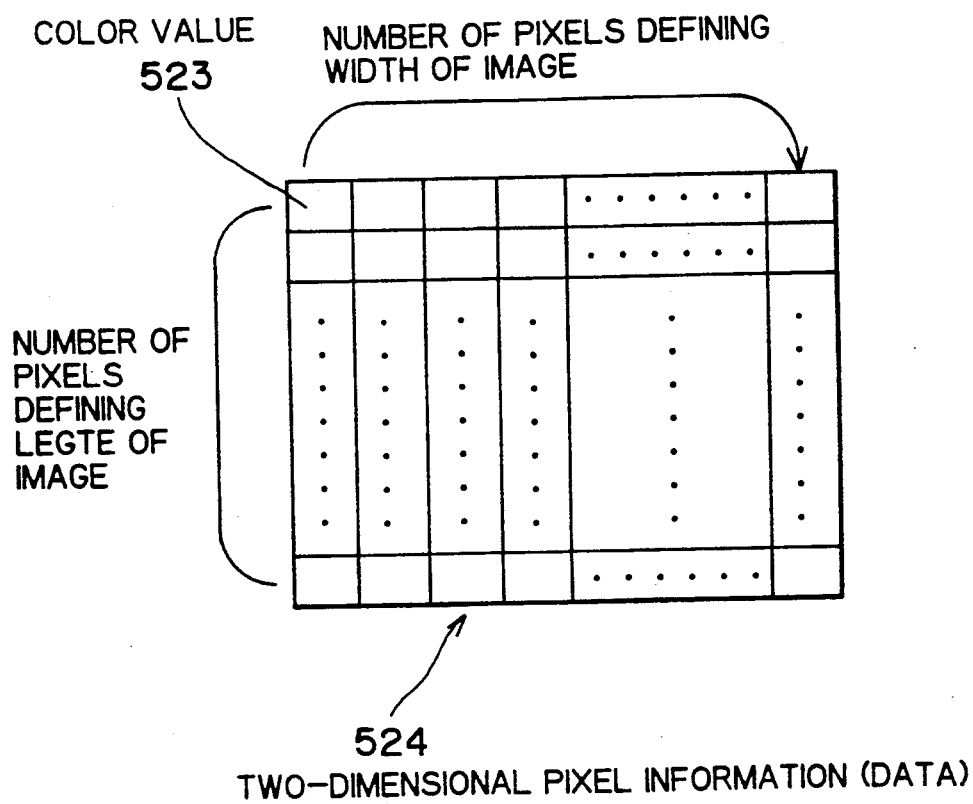

FIG. 9 illustrates the data structure of an example 510 of the line segment data 7a or 7b (FIG. 1) produced from the command data 500 (501–505) shown in FIG. 8. Each piece of line segment data 500 has a data structure having four fields; a start position 511, an end position 512, a color 513, and image management information such as an image flag and an image ID. This data structure is common to first line segment data 7a produced from the graphic image command data (503, 504), and second line segment data 7b produced from the bit image command data (505). The pieces of line segment data are ordered in the sequence of interpretation and stored in corresponding ones of separate storage areas of a line segment data buffer 515 which are equal in number to the total number of rasters in a print output to be obtained. Buffer management information 516 holds the utilization rate of the line segment data buffer 515 and the position of empty areas of the line segment data buffer 515. Auxiliary buffer management information 518 holds information about connection between the line segment data buffer 515 and a line segment data auxiliary buffer 517. The buffer management information 516 includes a line segment data counter for counting the number of entry of the line segment data into the buffer 515. The auxiliary buffer management information 518 includes a dot pointer indicating whether or not the line segment data are stored in the line segment auxiliary buffer 517. The line segment data buffer 515 is formed in the second dynamic memory 311, and the line segment data auxiliary buffer 517 is formed in the hard disk 309. The buffers 515 and 517 and the informations 516 and 518 cooperate to serve as the line segment data retaining part 405 shown in FIG. 6.

FIG. 10 illustrates the structure of an example 520 of the bit image information data 8 (FIG. 1) produced from the bit image commend data 505 of FIG. 8. The bit image information data 520 contains coordinates 521 of an upper left corner of the bit image represented by the bit image command data, the number of pixels 522 arranged in the direction of width and length of the image, two-dimensional pixel data 524 composed of an ordered array of color values 523 of pixels, and an image ID 525 which serves as image management information for identifying individual bit images when a plurality of bit images are contained in a plurality of the bit image command data. The bit image information data 520 are stored in the bit image information retaining part 406 shown in FIG. 6 which is formed in the hard disk drive 309.

Figure 11:
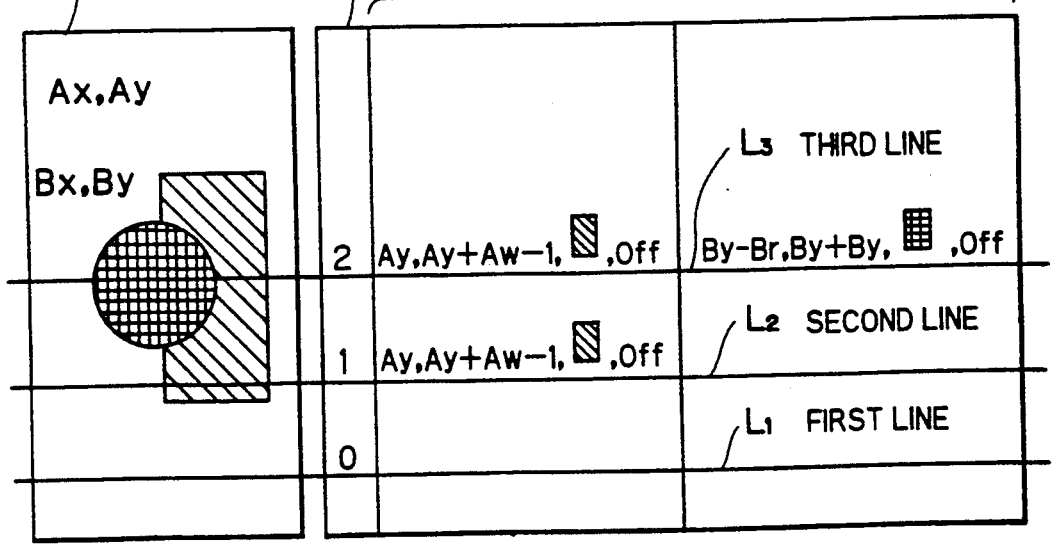
FIG. 11 is a diagrammatical view showing the manner in which the line segment data are produced to be stored in the data buffer based on the result of interpretation of examples of the graphic image command data in the first and second embodiments of the present invention.

FIG. 11 illustrates the manner in which the line segment data 510 (FIG. 9) are produced from the graphic image command data 503, 504 (FIG. 8) and are stored in the line segment data buffer 515, with referring to concrete examples of the graphic image command data.

As shown in FIG. 11, now assume that the command data group includes two graphic image command data, namely a first graphic image command data 710 and a second graphic image command data 711. The first graphic image command data 710 is an embodiment of the rectangle graphic image command data 503 shown in FIG. 8 and is for plotting or drawing with oblique lines a rectangle which has an upper left corner specified by coordinates Ax and Ay, a width Aw and a length Ah. The second graphic image command data 711 embodies the circle graphic image command data 504 shown in FIG. 8 and is for plotting or drawing with crosshatching lines a circle having a center specified by coordinates Bx and By, and a radius Br. A print image to be formed by the first and second graphic image command data 710 and 711 is generally designated by 712. By the first graphic image command data 710 is drawn an oblique-lined or hatched rectangle having an upper left corner specified by coordinates Ax and Ay. Then, by the second command data 711, a crosshatched circle having central coordinates of Bx, By is drawn over the rectangle.

As apparent from the above, in the present invention, the graphic image represented by the graphic image command data may include not only such an image as has a single color but also an image having a single color distribution. That is, the graphic image may include an image of a shape (e.g., a rectangular shape, a circular shape, etc.) having a single color and an image of a shape in which at least two colors are distributed in a single distribution manner. For example, the graphic image may be a hatched image or a cross-hatched image. In the case where the graphic image has a single color, the line segment data is produced to include a positional information and the color value of the line segment image for the graphic image, as described above. To the contrary, in the case where the graphic image has a single color distribution, the corresponding line segment data includes positional information and a state of the color distribution (e.g., hatching and crosshatching state) of the line segment image for the graphic image, as will be described below. To summerize, the line segment data for the graphic image includes a positional information and the color (distribution) state of the line segment image for the graphic image.

Based on the result of interpretation of the first and second graphic image command data 710 and 711, the line segment data is stored in a line segment data buffer 714 (515). The number of the line segment data stored in the buffer 714 is counted by a line segment data counter 713 which is one item of the line segment data buffer management information 516. The line segment data to be stored in the line segment data buffer 714 includes a start point of a line segment image, an end point of the line segment image, a color of the line segment image, and an image flag specifying the kind of the command data, i.e., the graphic image. The image flag of the line segment data for the graphic image commend data 710 and 711 are set to the "OFF" state.

A first line L1 in the buffer 714 shows a result of storage of the line segment data in the buffer 714 where no graphic image is to be plotted. The line segment data counter 713 of this first line L1 is therefore set to "0" and no line segment data is stored in the line segment data buffer 714.

A second line L2 shows a result of storage of the line segment data in the buffer where plotting is to be done by the rectangle command data 710. The line segment data counter 713 of this second line L2 is therefore set to "1", and the line segment data buffer 714 stores therein a single line segment data representing that a start y-coordinate is Ay, an end y-coordinate is Ay+Aw−1, a color value is oblique lines or hatching, and an image flag is "OFF".

A third line L3 shows a result of storage of the line segment data in the buffer obtained at the line passing through the center of the circle 711 where plotting is to be done by the rectangle command data 710 and the circle command data 711. The line segment data counter 713 of this third line L3 is therefore set to "2". The line segment data buffer 714 stores therein a first line segment data representing that a start y-coordinate is Ay, and end y-coordinate is Ay+Aw−1, a color value is oblique lines or hatching, and an image flag is "OFF", and a second line segment data representing that a start y-coordinate is By−Br, an end y-coordinate is By+Br, a color value is crosshatching, and an image flag is "OFF".

Figure 12:
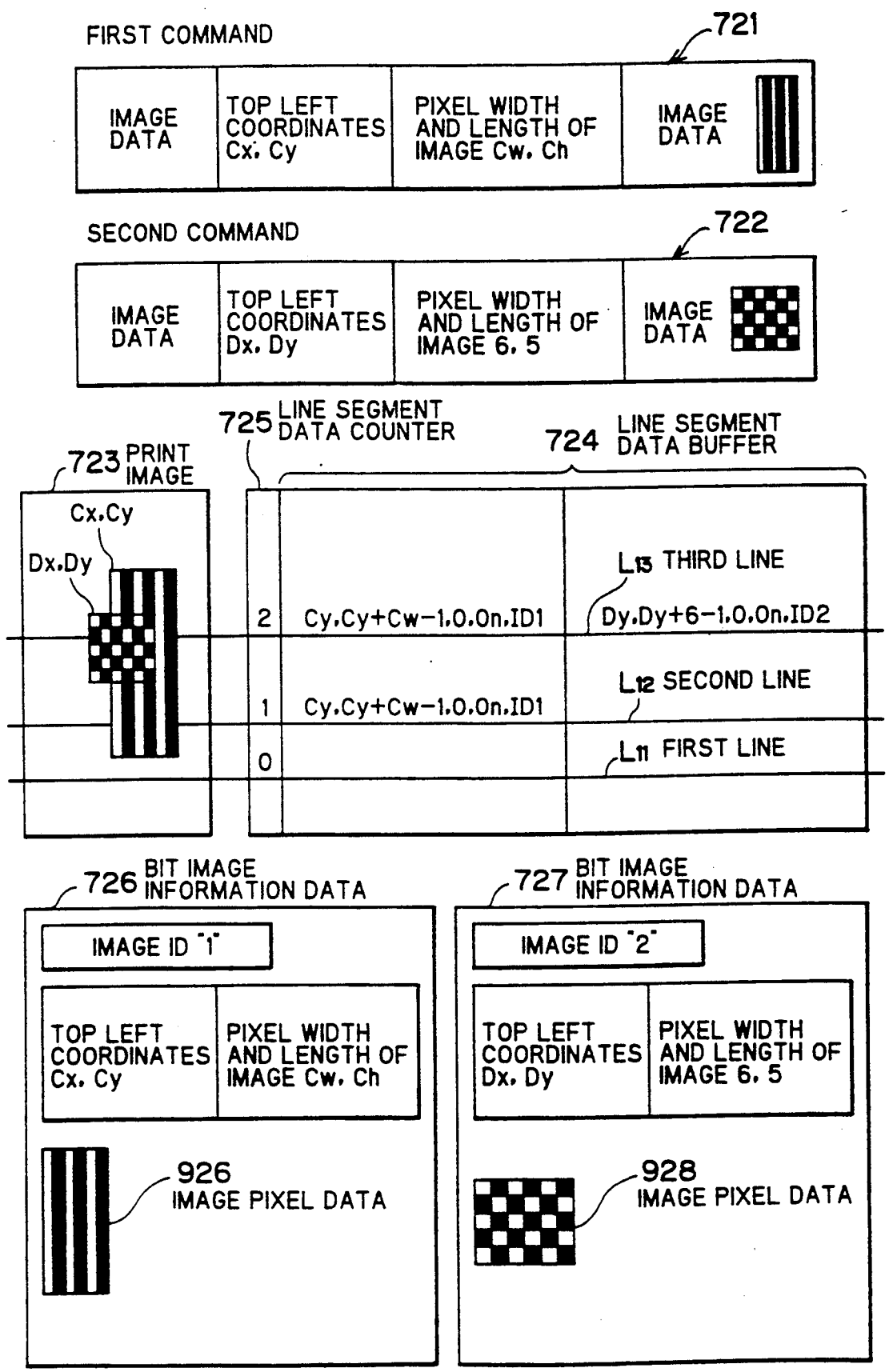
FIG. 12 is a diagrammatical view showing the manner in which the line segment data and the bit image information data are produced to be stored in the data buffer based on the result of interpretation of examples of the bit image command data in the first embodiment of the present invention.

FIG. 12 illustrates the manner in which the line segment data and the bit image information data are produced from the bit image command data 505 shown in FIG. 8 and are stored in the line segment buffer 515 and the hard disk drive 309, with reference to a concrete example for the bit image command data.

As shown in FIG. 12, now assume that the command data group is composed of two bit image command data, namely a first bit image command data 721 and a second bit image command data 722. The first bit image command data 721 is an embodiment of the bit image command data 505 shown in FIG. 8 and contains command data to plot or draw a vertically striped image having an upper left corner specified by coordinates Cx, Cy, a width Cw and a length Ch. The second bit image command data 722 is another embodiment of the bit image command data 505 shown in FIG. 8 and contains command data to plot or draw a checker-patterned image having an upper left corner specified by coordinates Dx, Dy, a width of image pixels (the number of pixels arranged in the widthwise direction) is "6" and a length of image pixels (the number of pixels arranged in the lengthwise direction) is "5". A print image to be formed by the first and second command data 721 and 722 is generally designated by 723. The print image is therefore composed of a vertically striped image drawn by the first command data 721 with reference to the coordinates Cx, Cy of its upper left corner, and a checker-patterned image drawn over the vertically striped image by the second command data 722.

A line segment data buffer 724 (515) and a line segment data counter 725 forming one item of the line data buffer management information 516 shown in FIG. 12 represent a result of interpretation of the bit image command data 721 and 722. Bit image information data 726 is further produced based on the first command data 721 and holds therein an image ID (a sequence of appearance of the bit image command data) of "1", coordinates Cx, Cy of an upper left corner of an image, a pixel width Cw and a pixel length Ch of the image, and image pixel data 926. Bit image information data 727 is produced from the second command data 722 and holds therein an image ID "2", coordinates Dx, Dy of an upper left corner of an image, a pixel width "6" and a pixel length "5" of the image, and image pixel data 928. The line segment data to be stored in the line data buffer 724 includes a start point of a line segment image, an end point of the line segment image, a color of the line segment image, an image flag of the image management information which is turned "ON" in this case, and the image IDs.

A first line L11 in the buffer 724 shows a result of storage of the line segment data in the buffer 724 where no bit image is to be plotted. The line segment data counter 725 of this first line L11 is therefore set to "0" and no line segment data is stored in the line segment data buffer 724.

A second line L12 shows a result of storage of the line segment data obtained where plotting is to be done by the first command data 721. The line segment data counter 725 of this second line L12 is therefore set to "1", and the line segment data buffer 724 stores therein a single line segment data representing that start y-coordinate is Cy, an end y-coordinate is Cy+Cw−1, a color value is "0", an image flag is "ON", and an image ID is "1".

A third line L13 shows a result of storage of the line segment data obtained where plotting is to be done by the first and second command data 721 and 722. The line segment data counter 725 of this third line L13 is therefore set to "2". The line segment data buffer 724 stores therein a first line segment data representing that a start y-coordinate is Cy, and end y-coordinate is Cy+Cw−1, a color value is "0", an image flag is "ON", and an image ID is "1", and a second line segment data representing that a start y-coordinate is Dy, an end y-coordinate is Dy+6−1, a color value is "0", an image flag is "ON", and an image ID is "2".

Figure 13A:
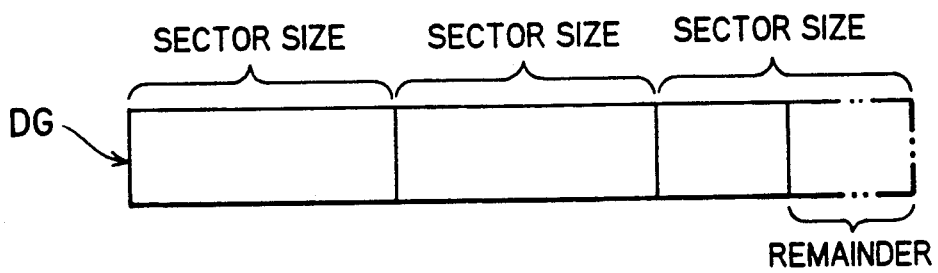
FIGS. 13A and 13B are diagrammatical views illustrative of the manner in which to the remainder of the divided group of line segment data is added dummy data to form a group of line segment data whose size is an integral multiple of the sector size.
Figure 13B:
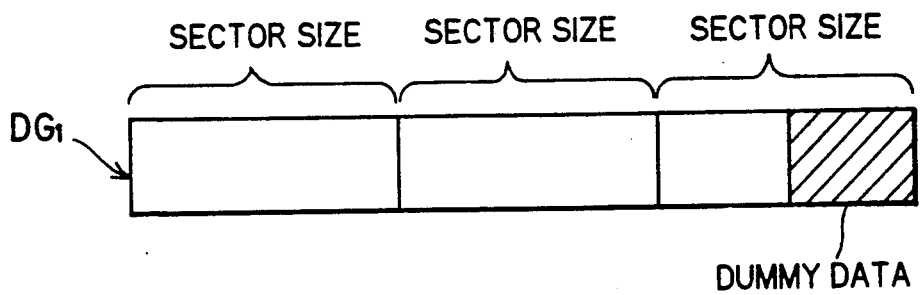

According to this embodiment, if the amount of line segment data obtained for one line or raster of the print output is small, the line segment data is stored in the line segment data buffer 515 formed in the dynamic memory 311. However, when the amount of the line segment data exceeds the capacity of the line segment data buffer 515 and overflows the line segment data buffer 515, a part of all the line segment data for one raster which is constructed by a plurality (an integral number) of line segment data is transferred, as a line segment data group, from the line segment data buffer 515 to the line segment data auxiliary buffer 517 formed in the hard disk drive 309. In this instance, a data size conversion process in the data size conversion part 408 (FIG. 6) is executed by the second CPU 310. More specifically, as shown in FIG. 13A, a data size of the line segment data group DG (formed by a plurality of (an integral number of) the line segment data) to be transferred to the hard disk drive 309 is divided by a sector size of the hard disk drive 309 which is a minimum unit for reading and writing operation of the hard disk drive 309. If the data size of the line segment data group is not divided out by the sector size (that is, if the data size is not an integral multiple of the sector size), dummy data is added to the remainder until one complete sector size is produced, as shown in FIG. 13B. Thus, a group of line segment data DG1 is formed by the data size conversion. The thus formed line segment data group DG1 is apparently composed of an integral number of the line segment data and has a size of an integral multiple of the sector size of the hard disk (product of integer (three in FIG. 13A) and the sector size). Accordingly, it is possible to shorten the period of time required for transferring the line segment data group to the auxiliary buffer 516 in the hard disk drive 309.

Figure 14:
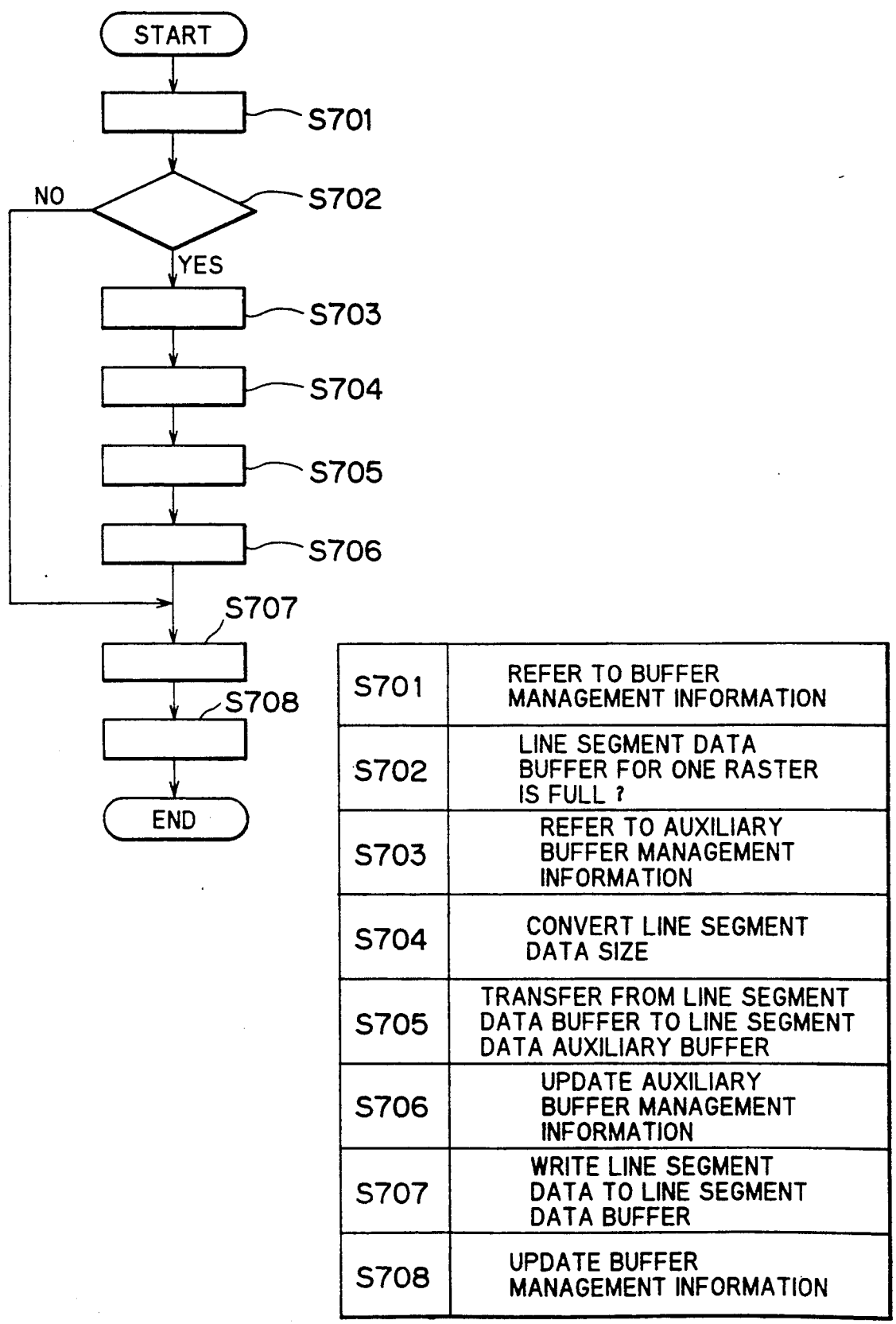
FIG. 14 is a flowchart illustrative of the manner in which the line segment data is stored in the first and second embodiments of the present invention.

FIG. 14 is a flowchart illustrative of the manner in which the line segment data is stored in the buffers 515 and 517.

When a line segment data for a given raster is produced from the command data, the buffer management information 516 (FIG. 9A) retaining the utilization rate and the position of empty areas of the linear data buffer 515 (FIG. 9A) corresponding to the given raster is first referenced at a step S701. Then, a step S702 judges whether or not the line segment data buffer 515 is able to accept entry of a new line segment data.

If the line segment data buffer 515 is already full and, hence, writing of the line segment data to the line data buffer 515 is not possible, a step S703 refers to the auxiliary buffer management information 518 (FIG. 9A) which holds the utilization rate of the line segment data auxiliary buffer 517 (FIG. 9B) and information about the connection between the line segment data buffer 515 and the line segment data auxiliary buffer 517. With this step S703, a destination of transfer of the line segment data group described later is determined. Subsequently, a step S704 retrieves a plurality of the line segment data which are a part or an entire part of the line segment data already stored in the line segment data buffer 515 for the given raster is retrieved as the group of line segment data DG, and then drives the line segment data size converting part 408 by the second CPU 310 to convert the data size of the line segment data group DG to an integral multiple of a sector size of the hard disk drive 309 in the manner as illustrated in FIGS. 13A and 13B and produce the line segment data group DG1. Thereafter, a step S705 transfers the line segment data group DG1 to the line segment data auxiliary buffer 517 in the hard disk drive 309, thereby freeing a part of the storage area of the line segment buffer 515 which has been occupied by the transferred line segment data group DG. Then, a step S706 updates or renews the auxiliary buffer management information 518 that holds pointers as information about the connection between the line segment data buffer 515 and the line segment data auxiliary buffer 517. The pointers point to specific storage locations of the two buffers 515, 517 between which the transfer of the line segment data group DG1 has been made. Due to the data size conversion achieved at the step S704, the access to the hard disk drive 309 is achieved sector-by-sector. Such an access method is highly efficient and is able to cut down the access time and increase the line segment data transfer rate to maximum.

In general, the cost per 1 bit of storage of the hard disk drive (309) is about 1/100 of that of the semiconductor memory (311). Accordingly, by using the semiconductor memory 311 in combination with the hard disk drive 309, and by optimizing the size of the unit of data to be transferred, it is possible to realize a largecapacity, low-cost buffer with no significant reduction in operation speed.

Subsequently, a step S707 writes a next generated line segment data to the line segment data buffer 515, and after that a step S708 renews the buffer management information 516.

The line segment data and the bit image information data produced and stored as described above are then processed by the raster image data developing part 407 shown in FIG. 6 as will be described below.

When the second CPU 310 has converted all the command data supplied to the print controller 300 for one page of print output into the line segment data 7a, 7b and the bit image information data 8 and has stored all the line segment data and all the bit image information data in the dynamic memory 311 and the hard disk drive 309, the CPU 310 gives a command or instruction to the dual port memory 308, notifying that printing is to be started. The first CPU 305, upon receipt of the instruction, writes signals to the FIFO 351 of the second interface control circuit 350, the signals forming a start command of the ink-jet printer 200. When the ready signal is generated, the second interface control circuit 350 retrieves the signals contained in the start command byte-by-byte from the FIFO 351 and delivers the signals to the second interface connector 302. At the same time, the second interface control circuit 350 issues data clock signal pulses one at a time. The interface control circuit 204 in the ink-jet printer 200 enters the above-mentioned signals into the FIFO 351 in synchronism with the data clock signal. The foregoing operation continues until the FIFO 351 in the print control apparatus 300 becomes empty or the FIFO 305 in the ink-jet printer 200 becomes full. The interface control circuit 204 notifies the CPU206 of a fact that the signals are inputted to the FIFO 305. The CPU 206 successively retrieves the signals from the FIFO 205 and when the start comand in the signals is acknoledged, causes a mechanism control circuit (not shown) to drive the motor 267 to rotate the drum 269.

Then, the second CPU 310 produces raster image data for each raster on the print output through restructuring the line segment data which is stored in the line segment data buffer 515 (memory 311) and the line segment data auxiliary buffer 517 (hard disk 309), and the bit image information data which is stored in the hard disk drive 309. It is noted that a program for the restructuring procedure has been transferred to the second dynamic memory 311 from the hard disk drive 309 in advance together with the program for interpreting the command data to produce the line segment data and the bit image information data. This program is also executed by the second CPU 310.

Figure 15:
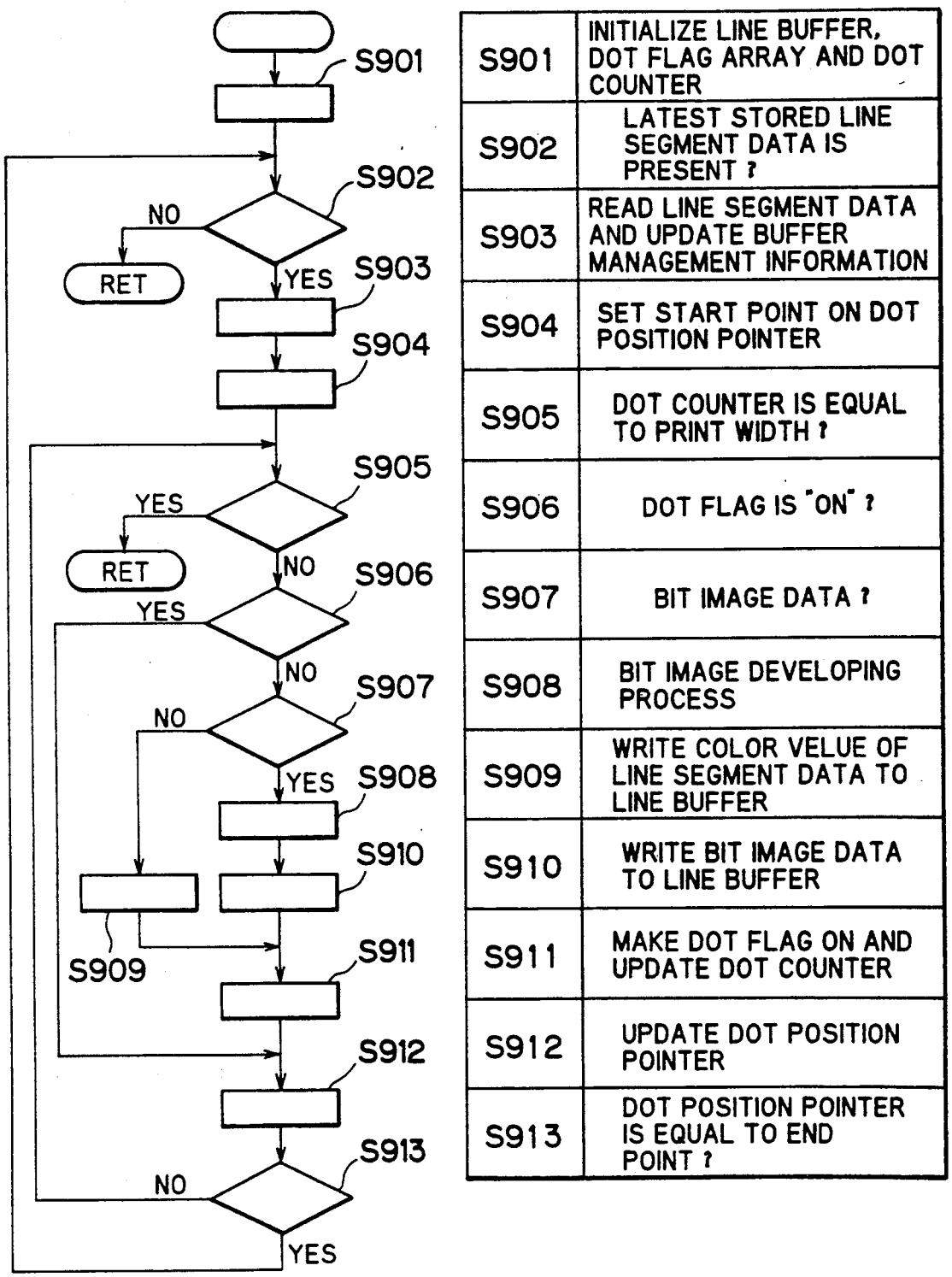
FIG. 15 is a flowchart showing the manner in which one raster is formed into raster image data.
Figure 16:
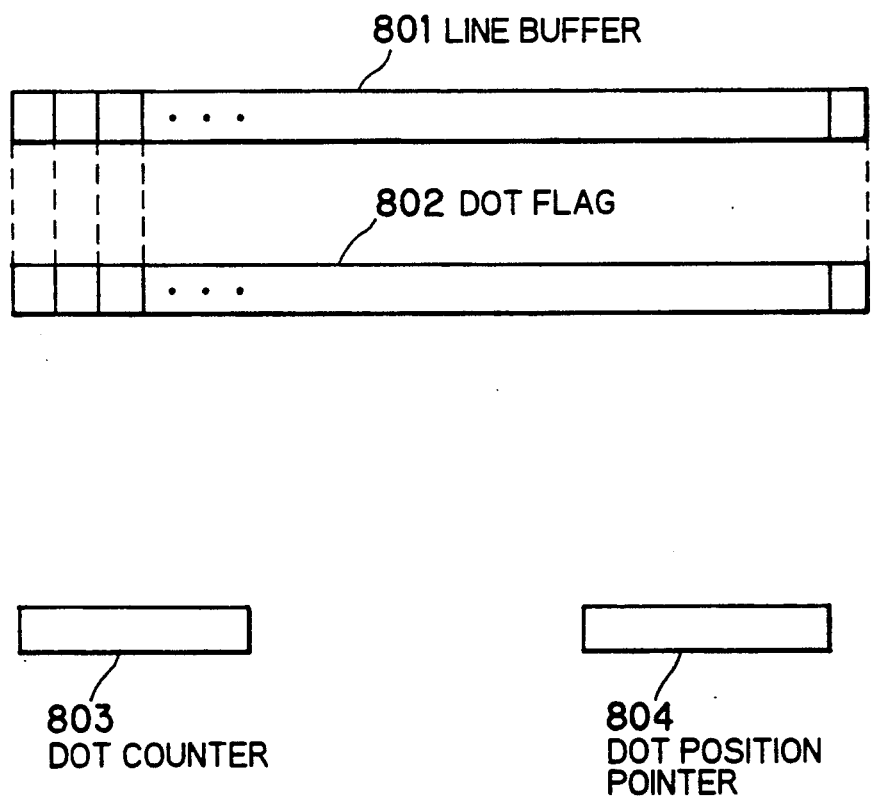
FIG. 16 is a diagrammatical view of a buffer for forming the raster image data in the first and second embodiments of the present invention.

A raster image data restructuring method will be described with reference to FIGS. 15 through 18. FIG. 15 is a flowchart showing the manner in which the raster image data is produced from the line segment data and the bit image information data. FIG. 16 shows a buffer provided on the second dynamic memory 311 for producing the raster image data. The buffer is composed of a line buffer 801 for storing the raster image data, an array of dot flags 802, a dot counter 803 and a dot position pointer 804. The dot flags 802 are equal in number to the number of dots contained in one raster. Each of the dot flags 802 is turned on or set to the "ON" state when writing is done against a corresponding one of the dots in one raster. The dot counter 803 counts the number of dots in the raster to which data has been written. The dot position pointer 804 indicates the start point of the line segment data retrieved from the buffer 515 or 517.

FIG. 15 is a flowchart illustrative of the manner in which one raster image data is produced for a given raster. The following processing steps begin from a leading raster and are achieved for each raster.

At first, in a step S901, the line buffer 801, the dot flag array 802, the dot counter 803 and the dot position pointer 804 are initialized. Then, a step S902 checks whether or not any line segment data is present at the given raster, referring to the contents of the corresponding buffer management information 516 and the corresponding auxiliary buffer management information 518. If the line segment data is not present in the given raster, the procedure is terminated. Conversely, if a line segment data is present, one line segment data is retrieved from the buffer 515 or 517 and the informations 516 and 518 are renewed at a step S903. At this step S903, the line segment data for the given raster now stored in the line segment buffer 515 (and the line segment auxiliary buffer 517) may all be retrieved therefrom, and then the one line segment data may be taken out of the thus retrieved plural line segment data. In this case, if the line segment data for the given raster are now stored only in the buffer 515, the line segment data are retrieved from the buffer 515, and then one of the thus retrieved plural line segment data is taken out therefrom. If a first part of all of the line segment data now stored for the given raster consisting of a plurality of line segment data (which will be referred to as a "first line segment data group", hereinafter) is stored in the buffer 515 and a remaining part of all of the line segment data consisting of a plurality of line segment data (which will be referred to as a "second line segment data group", hereinafter) is stored in the auxiliary buffer 517, the first and second line segment data groups are retrieved from the buffers 515 and 517, and then one of the thus retrieved plural line segment data is taken out therefrom. It is noted that since the size of the second line segment data group has been already converted to an integral multiple of the sector size of the auxiliary buffer 517 (hard disk 309) at the time of entry thereof, there is no possibility that unnecessary data is retrieved from the auxiliary buffer. It is, therefore, possible to maximize the access time of the auxiliary buffer 517 (the hard disk drive 309) and maximize the transfer rate of the line segment data group.

At this step S903, retrieving or taking the one line segment data out of all the line segment data now stored for the given raster is achieved such that one line segment data to be retrieved next is the most recently stored line segment data. To summerize, at the step S903, the line segment data is retrieved in the reverse sequence of entry.

Then, the position of the start point of the retrieved line segment data is set to the dot position pointer 804 at a step S904. Then, a step S905 checks whether the dot counter 803 is equal to, or matches with, the print width. If matching is found, then the procedure is terminated.

At a step S906, the dot flag corresponding to a position indicated by the current dot position pointer 804 is checked at a step S906 and if the dot flag is set to the "ON" state, then the procedure jumps to a step S912. Conversely, if the dot flag is "OFF", the image flag of the line segment data is checked at a step S907. If the image flag is set to the "ON" state, the line segment data represents a bit image, and therefore the bit image information data corresponding to the line segment data is developed into a bit image data at a step S908, and after that the bit image data is written to the corresponding dot in the line buffer at a step S910. If the image flag is "OFF" at the step S907, on the other hand, the line segment data represents a graphic image, and therefore a color value of the current line segment data is written to the line buffer at step S909. Subsequently, the dot counter is updated or renewed, and the corresponding dot flag 802 is set to the "ON" state at a step S911. Then, the dot position pointer 804 is renewed or updated at a step S912. A next succeeding step S913 checks whether or not the dot position pointer 804 is equal to, or matches with, the end position of the current line segment data. If match is found, the procedure returns to the step S902. Conversely, no match is found at the step S913, the procedure returns to the step S905.

The above-mentioned procedure accomplished to develop the line segment data and the bit image information data to the raster image data has two stop conditions, namely the step S902 and the step S905. In one stop condition provided at step S902, no line segment data is found on the corresponding raster. This condition is, therefore, a normal stop condition. The other stop condition provided at the step S905 is that the dot counter is equal to the print output width, i.e., the line segment data remains in the buffers 515 and 517 even after when all the dots of the line buffer are written or occupied. In this condition, a line segment image corresponding to the remaining line segment data will hide under line segment images corresponding to the line segment data which are already developed into the line buffer, as apparent from the rectangle 602 overlapped by the circle 603 as shown in FIG. 7A. The remaining line segment data therefore are unnecessarily developed into the raster image data. Accordingly, in the present invention, the line segment data which represents an image overlapped by another image and which is unnecessarily developed into the raster image data is not developed into the raster image data. Accordingly, the raster image data developing time is saved, and the raster image developing process can be performed at high speed.

Similarly, in the step S906, for a dot position on the raster where a raster image data is already set and therefore the corresponding dot flag is ON, another line segment data is not developed into another raster image data. Accordingly, a line segment data representative of an image overlapped by another image represented by another line segment data which is already developed into the raster image data is not developed into the raster image data. Therefore, the raster image data developing process is performed at high speed.

It is noted that at the step S903, the line segment data may be retrieved from the line segment data storing part 405 in a manner described below. At first, the first line segment data group in the given raster is retrieved from the line segment data buffer 515. Then, auxiliary buffer management information 518 corresponding to the above-mentioned raster is checked as to whether or not a pointer is stored, thus determining the presence of information about connection between the line segment data buffer 515 and the line segment data auxiliary buffer 517. If the pointer is stored, the second line segment data group which is specified by this pointer is retrieved from the line segment data auxiliary buffer 517. Conversely, if no pointer is stored in the auxiliary buffer management information 518, this means that the second line segment data group for this given raster is not stored in the segment data auxiliary buffer 518. Accordingly, the retrieving process is terminated.

At the step S908, bit image information data stored independently of the line segment data is retrieved from the hard disk drive 309.

The method of developing examples of the line segment data and the bit image information data shown in FIGS. 11 and 12 to the raster image data in the line buffer 801 will be described in greater detail with reference to FIGS. 17 and 18.

Figure 17:
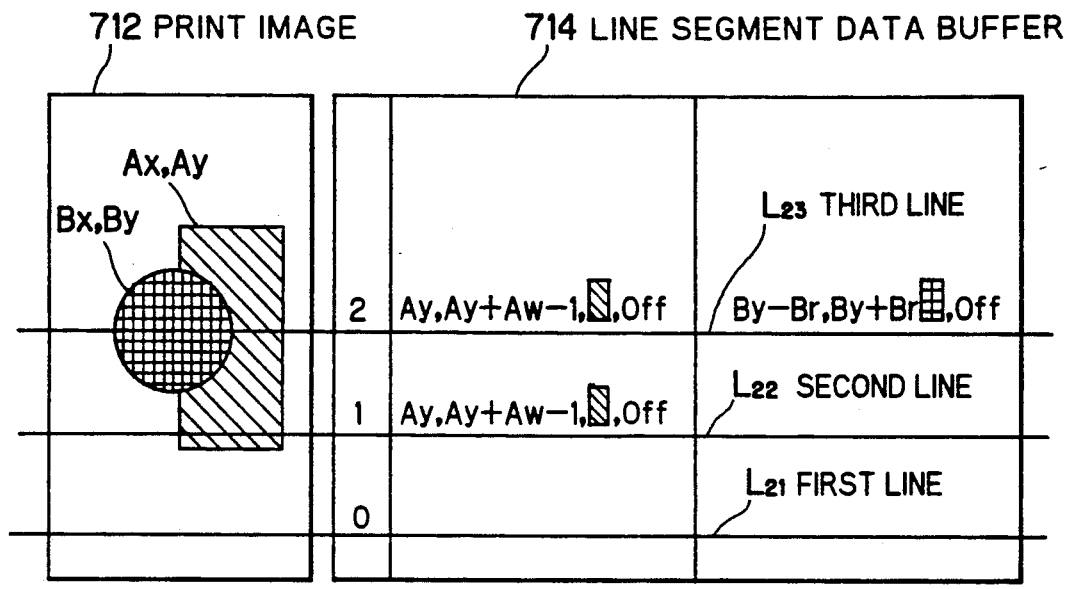
FIG. 17 is a diagrammatical view illustrative of the manner in which the examples of the line segment data are developed to the raster image data in the line buffers in the first and second embodiments of the present invention.
Figure 17:
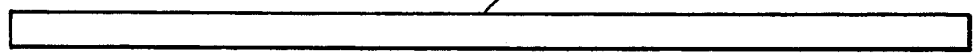
Figure 17:
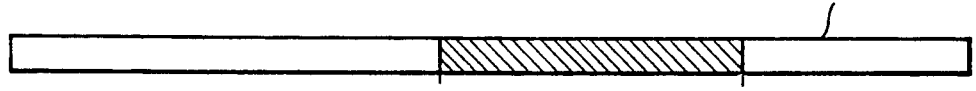
Figure 17:

FIG. 17 diagrammatically illustrates the manner in which the line segment data shown in FIG. 11 is developed to the raster image data in the line buffer.

A first line L21 shows a result of storage of a line buffer 913 where no image is to be plotted.

A second line L22 shows a result of storage of a line buffer 914 where plotting is to be done only by the line segment data produced from the rectangle image command data 710. A storage area of the line buffer 914, ranging from a location specified by a y-coordinate $Ay$ to a location specified by a y-coordinate $Ay+Aw-1$, is occupied by line segment data 714 having a color value represented by oblique lines or hatching.

A third line L23 shows a result of storage of the line buffer 915 obtained at a raster passing through the center of a circle where plotting is to be done by the line segment data produced from the rectangle image command data 710 and the circle command data 711. A first area of the line buffer 915, ranging from a location specified by a y-coordinate $By-Br$ to a location specified by a y-coordinate $By+Br$, is occupied by a first line segment data 714 having a color value represented by crosshatching. Accordingly, a part ranging from a y-coordinate $Ay$ to a y-coordinate $By+Br$ of a second area of the line buffer 915 which ranges between a y-coordinate $Ay$ and a y-coordinate $Ay+Aw-1$ is already occupied by the cross-hatched first line segment data. Therefore, a second line segment data 714 having a color value of hatching is stored only in the remainder of the second area of the line buffer 915 ranging between the y-coordinate $By+Br$ and the y-coordinate $Ay+Aw-1$.

Figure 18:
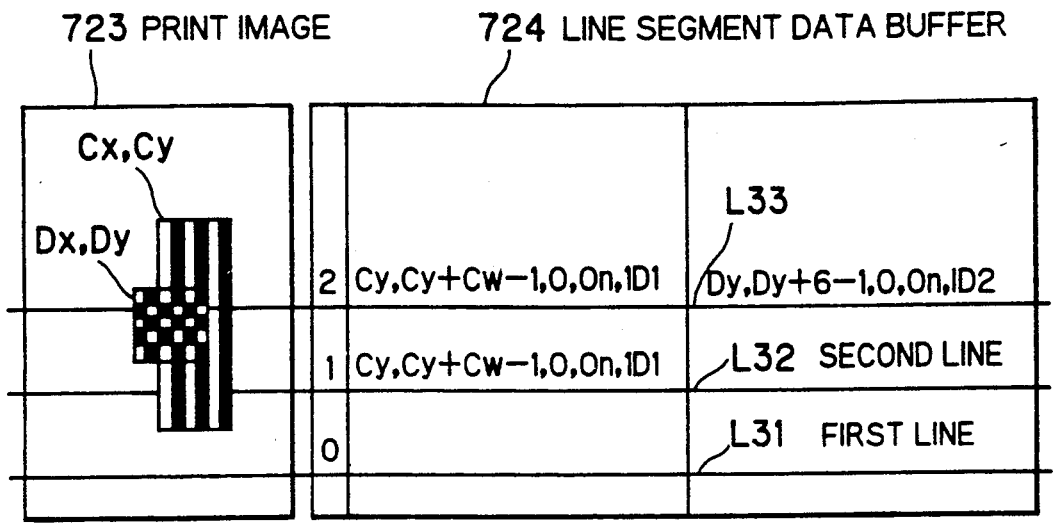
FIG. 18 is a diagrammatical view showing another manner in which the examples of the line segment data and the bit image information data in the first embodiment are developed to the raster image data in the line buffers.
Figure 18:
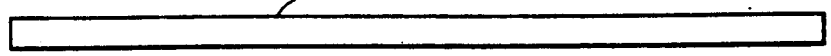
Figure 18:
Figure 18:
Figure 18:
Figure 18:

FIG. 18 diagrammatically illustrates the manner in which the examples of the line segment data and the bit image information data generated as shown in FIG. 12 are developed into the raster image data in the line buffer.

A first line L31 shows a result of storage of the line buffer 923 where no image is to be plotted. A second line L32 represents a result of storage of the line buffer 924 obtained where plotting is to be done only by the first command data 721. Among the pixel information contained in the image pixel data 926 of the bit image information data 726 having image ID of "1", such a portion of the pixel information as corresponds to an area represented by the line segment data buffer 724 are written to an area of the line buffer 924 ranging between a y-coordinate $Cy$ and a y-coordinate $Cy+Cw-1$. A third line L33 shows a result of storage of the line buffer 925 where plotting is to be done by the first and second command data 721 and 722. Among the pixel information contained in the image pixel data 928 of the bit image information data 727 having image ID of "2", such a portion of the pixel information as corresponds to an area represented by the line segment data 724 is written to a first area of the line buffer 925 ranging between a y-coordinate $Dy$ and a y-coordinate $Dy+6-1$. Accordingly, a part ranging from a y-coordinate $Cy$ to a y-coordinate $Dy+6-1$ of a second area of the line buffer 925 which ranges between a y-coordinate Cy and a y-coordinate $Cy+Cw-1$ is occupied by the image pixel data 928. Therefore, a portion of the pixel information, which is contained in the image pixel data 926 of the bit image information data 726 having an image ID of "1" and which is corresponding to an area represented by the line segment data 724, is written to the remainder of the second area of the line buffer 925 ranging between a y-coordinate $Dy+6-1$ and a y-coordinate $Cy+Cw-1$.

When the above-described raster image data developing process is finished, the second CPU 310 transfers the raster image data to the dual port memory 308 and sends a command or instruction that the first CPU 305 should read the raster image data from the dual port memory 308.

The first CPU 305 (FIG. 3) places the thus developed raster image data into the first dynamic memory 306 and instructs the DMAC 314 to write the developed raster image data to the second interface circuit 350. In this instance, the necessary capacity of the first dynamic memory 306 is as large as the amount of the raster image data contained in one raster. This capacity is incomparably smaller than the usual capacity which is required to store developed raster image data of one page size. When FIFO 351 comes to the full load condition, the DMAC 314 stops or discontinues its writing operation. The writing operation of the DMAC 314 is resumed as soon as the FIFO 351 becomes empty. During the interruption of the direct memory transfer, the first CPU 305 is permitted to transfer the next line segment data from the hard disk drive 309 to the second CPU 310 and to place the developed raster image data into another area of the first dynamic memory 306. In addition, since the second CPU 310 is able to continue the raster image data developing operation regardless of whether or not the bus 230 is occupied, a high speed processing is possible. When the DMAC 314 writes the developed raster image data to the FIFO 351, the raster image data is sent to the ink-jet printer 200 in the same manner as the delivery of the signals such as a start command described already, and the CPU 206 temporarily places the raster image data in the dynamic memory 207.

The CPU 206 places only those raster image data components related to cyan successively to the fourth data memory 212 until entry of a one-raster amount of the cyan-related raster image data components is completed. Then, the CPU 206 gives a command or instruction to the data readout control circuit 208, initiating printing by one raster size. Upon receipt of the instruction, the data readout control circuit 208 supplies the content of the data memory 211 to the fourth head control circuit 216 in synchronism with the output signal of the encoder 266. The fourth head control circuit 216 determines an amount of driving of the ink-jet head 254 based on the content of the raster image data supplied and drives the ink-jet head 254 so that a controlled amount of ink is ejected from the ink-jet head 254 onto the paper 264. The amount of ink ejected from the head 254 is determined depending on the driving amount of the ink-jet head 254. Thus, one raster image of cyan is printed on the paper 264 retained on the drum 269. Then, the CPU 206 moves the ink-jet head 254 in the axial direction of the drum 264 by a one-raster distance, and after that the aforementioned operation is repeated to print out succeeding cyan raster images. When the ink-jet head 253 comes to the position of the first cyan raster, then a similar operation is achieved repeatedly in conjunction with those data related to magenta and cyan. If the necessary data is not held in the dynamic memory 207, the printing operation is suspended until the necessary data is supplied to the dynamic memory 207.

Thereafter, foregoing operation is also repeated with respect to yellow and black until the raster image data is fully outputted. During that time, the operation of the ink-jet heads 251, 252, 253, 254 is stopped successively in the reverse sequence of initiation. Namely, the ink-jet head 254 for cyan is stopped first and the ink-jet head 251 for black is last. Thus, a full-color printout is formed on the paper 264. A capacity requisite to the dynamic memory 207 in the ink-jet printer 200 is equal to the sum of capacity of memories each of which is required to accomplish printing of a distance between the adjacent ink-jet heads. This capacity is incomparably smaller than a full-page amount capacity of conventional raster image memory but is enough to provide a printout of the same quality.

Figure 19:
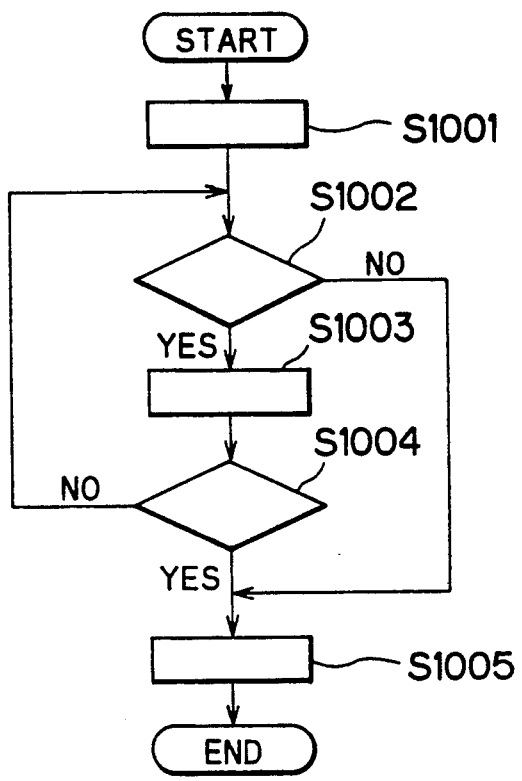
FIG. 19 is a flowchart showing a sequence of operations beginning at a print start and ended to a print restart preparation process.
Figure 20:
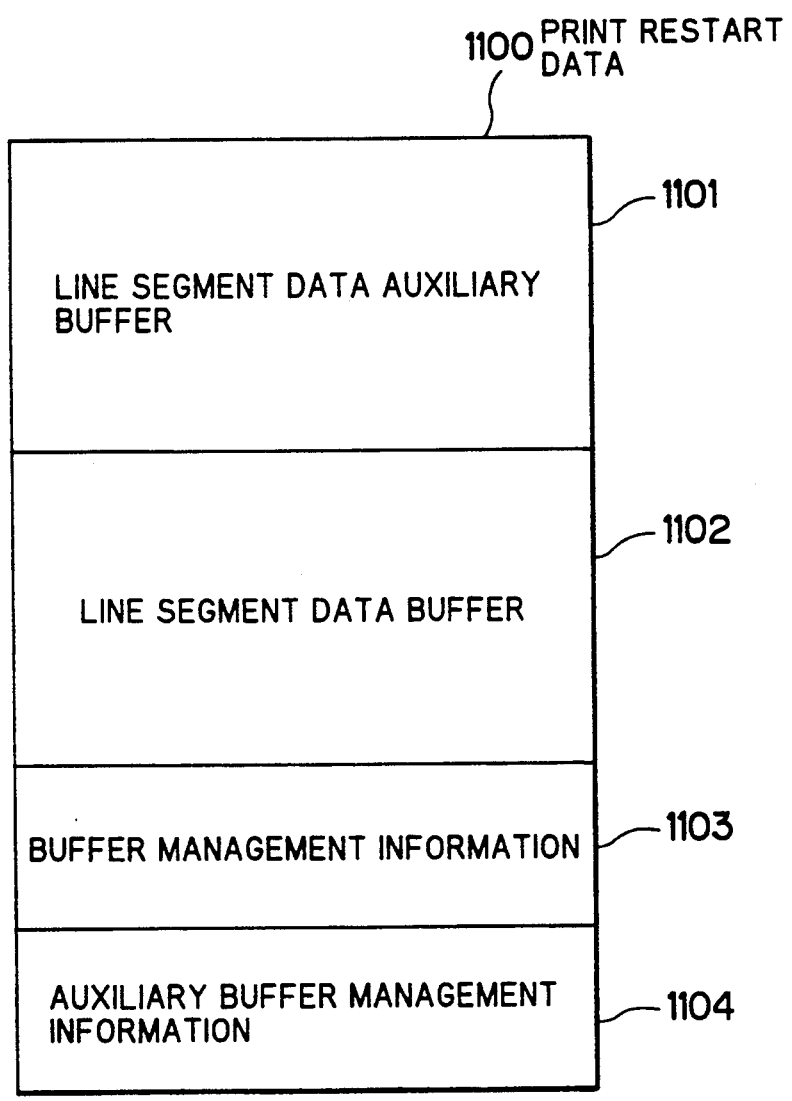
FIG. 20 is a diagrammatical view showing the structure of data used for restarting printing operation.

FIG. 19 is a flowchart showing a sequence of operations beginning at a print start step and ended to a print restart preparation process. FIG. 20 diagrammatically shows the structure of a print restart data.

As shown in FIG. 19, when the ink-jet printer 200 (FIGS. 1 and 4) is driven to start printing by the start command described already, at a step S1001, the next step 1002 judges whether or not the above-mentioned raster image data is present. If no raster image data is found, it is judged that one page of print output has been produced, and the procedure jumps to a step S1005. Conversely, if the raster image data is found, the raster image data is supplied to the ink-jet printer 200 at a step S1003. Subsequently, a judgment is made at a step S1004 to determine the current status or condition of the ink-jet printer 200. If an "off-line" state is not found, the procedure returns to the step S1002. The "off-line" state occurs when the ink-jet printer is out of ink, or when a body cover of the ink-jet printer opens during printing. The "off-line" state is detected by a detection circuit (not shown) in the CPU 206 and represented by an off-line signal 231 which is supplied from the interface control circuit 204 to the second CPU 310 (FIG. 3). If the "off-line" state of the ink-jet printer 200 occurs after or during the printing operation or if the printing of one page of print output has been completed, a print restart preparation process is carried out at the step S1005. At the step S1005, to enable the ink-jet printer 200 to resume or restart its printing operation, the contents of the line segment data buffer 515, buffer management information 516, and auxiliary buffer management information 518 that are all stored in the dynamic memory 311 are written in the hard disk drive 309. Thus, written data are added to the line segment data auxiliary buffer 517 formed in the hard disk drive 309 (FIG. 9B), thus forming print restart data 1100, as shown in FIG. 20. The print restart data 1100 is therefore composed of line segment data auxiliary buffer 1101 (517), a line segment data buffer 1102 (515), buffer management information 1103 (516), and an auxiliary buffer management information 1104 (518). In this case, since the line segment data auxiliary buffer provided in the hard disk drive 309 can be used again, and since the bit image information data retained in the hard disk drive 309 independently of the line segment data can be used again with no additional processing, the data can be written in less time.

The print restart preparation process S1005 follows a normal printing stroke. Accordingly, this process S1005 is accomplished independently of the time which is requisite for the raster image data developing process. In other words, the print restart preparation process is performed in parallel with a return stroke of the ink-jet heads of the ink-jet printer 200.

When printing operation is to be restarted, respective data items of the line segment auxiliary buffer 1101, the line segment data buffer 1102, buffer management information 1103, and auxiliary buffer management information 1104 are retrieved from the print restart data 1100 stored in the hard disk drive 309 and written to the second dynamic memory 311 to be developed into the raster image data through the same raster image data developing process described above. Since the print restart data 1100 is now stored in the hard disk drive 309 (non-volatile memory), print restart is still possible even if the print control apparatus 300 is reset by turning off the power or due to a power failure. Since the print restart data 1100 (i.e. the contents of the buffers 515 and 517) represent the image to be plotted on one page of print output, it is possible to completely reprint one page of print output at any time.

A second embodiment of the print control apparatus according to the present invention will be described with reference to FIGS. 21 through 27. This embodiment is substantially the same as the first embodiment shown in FIG. 1 except the way in which the raster image data is generated from the bit image information data.

Figure 21:
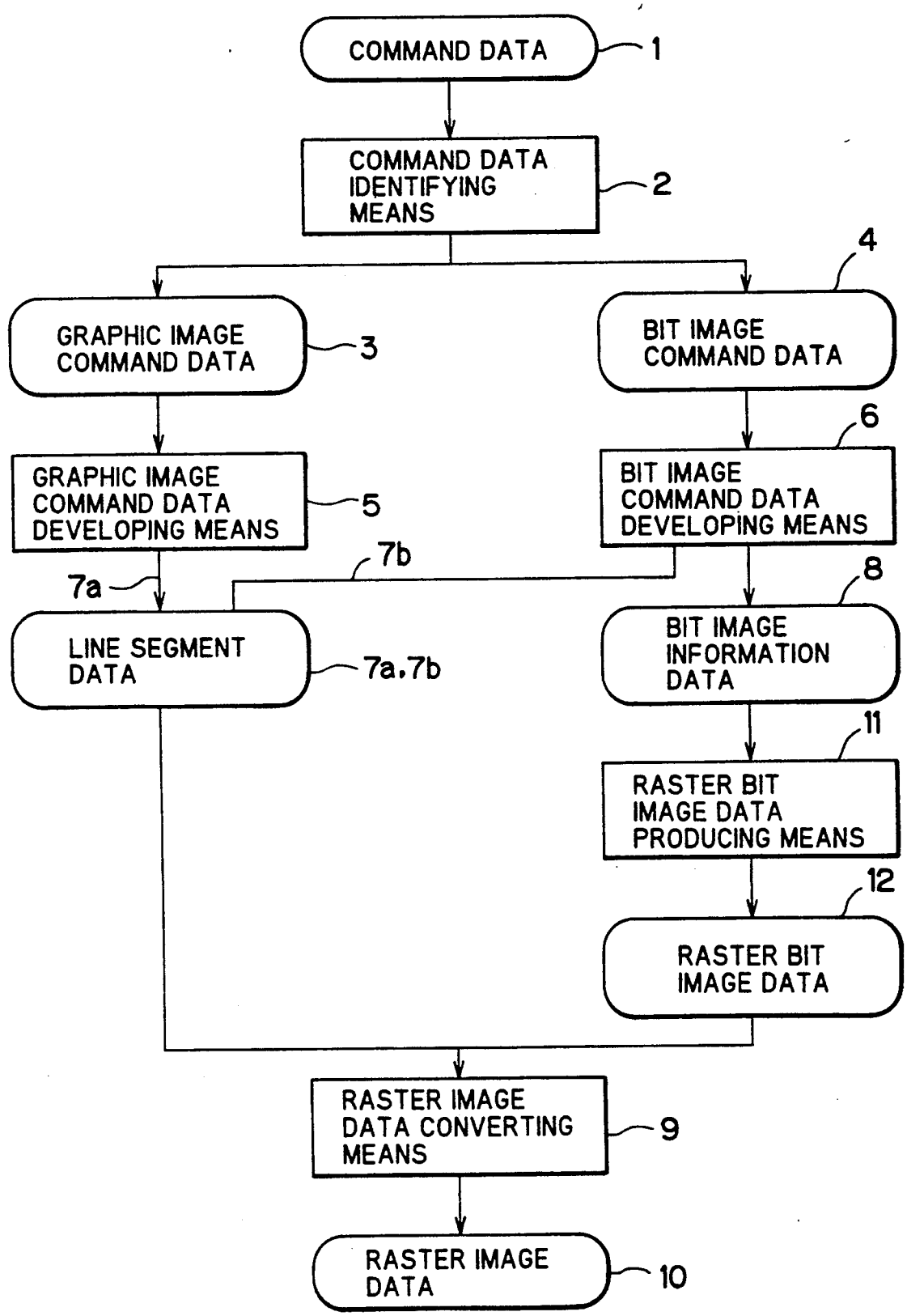
FIG. 21 is a functional block diagram of a print control apparatus according to a second embodiment of the present invention.

FIG. 21 is a functional block diagram of an image data generating operation of the print control apparatus according to the second embodiment. This unit differs from that of the first embodiment only in that there is provided an image converting means 11 for converting the bit image information data to the raster image data. These parts which are identical to those of the first embodiment shown in FIG. 1 are designated by the same reference characters and a further description thereof will be omitted.

As shown in FIG. 21, the image converting means 11 produces a raster bit image data 12 by subjecting the bit image information data 8 to an image conversion process. A raster image data generating means 9 then produces the raster image data 10 based on the aforementioned first and second line segment information data 7a and 7b and the raster bit image data 12.

Figure 22:
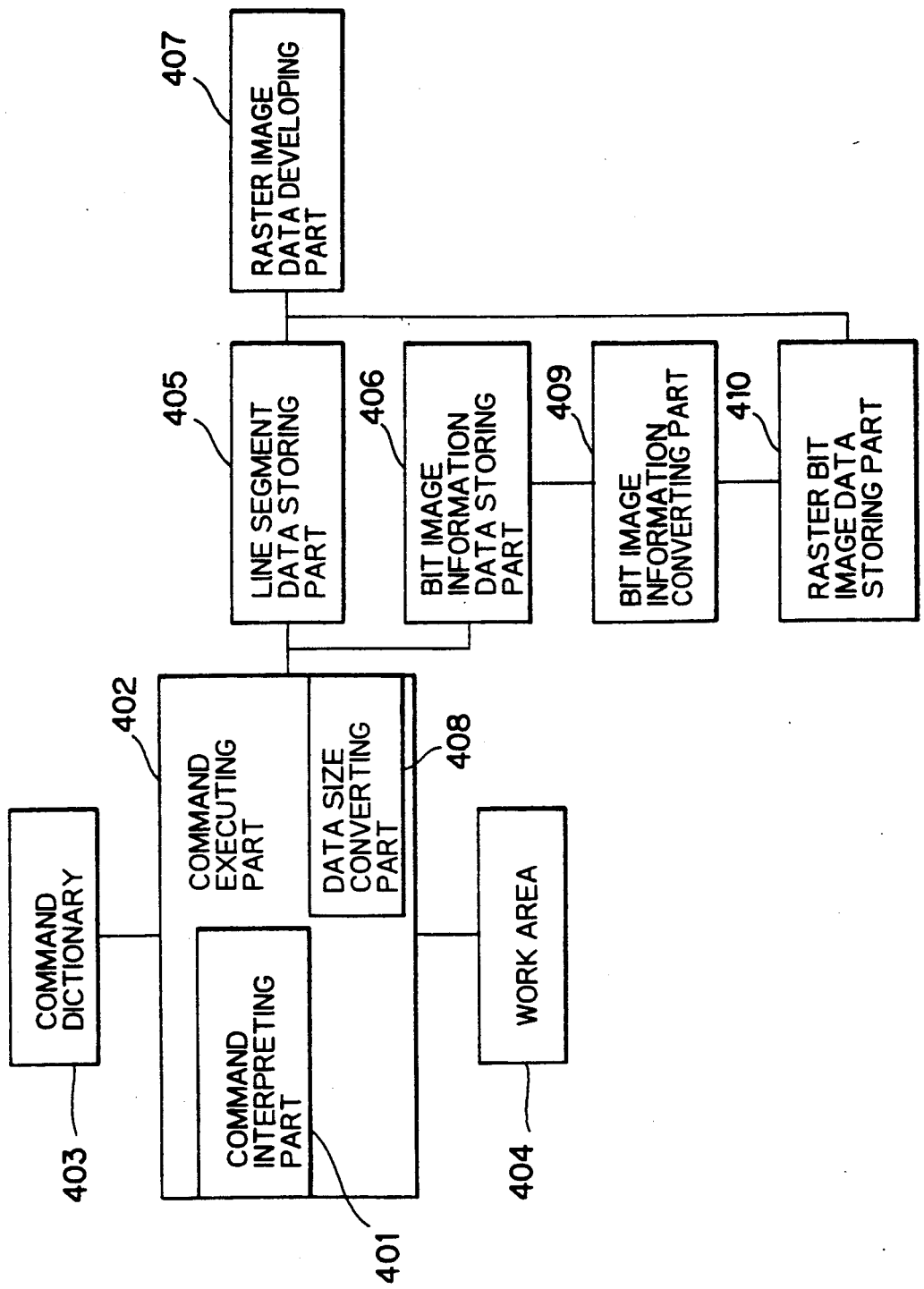
FIG. 22 is a functional block diagram showing a procedure achieved in the second embodiment to interpret the command data group, then store line segment data and bit image information data, and thereafter develop the line segment data and raster bit image data to raster image data.

As shown in FIG. 22, the bit image information data 8 stored in the bit image information data retaining part 406 is converted to the raster bit image data 12 through an image conversion process (scaling, for example) which is achieved by a bit image converting part 409. The raster bit image data 12 is then stored in a raster bit image storing part 410. The line segment data 7a, 7b stored in the line segment storing part 405 and the raster bit image data 12 stored in the raster bit image storing part 410 are developed to the raster image data 10 by the raster image data developing part 407. (Similarly to the parts 402, 403 and 407, the part 409 is stored in the hard disk 309 and is transferred to the second dynamic memory 311 to be executed by the CPU 310.)

Figure 23:
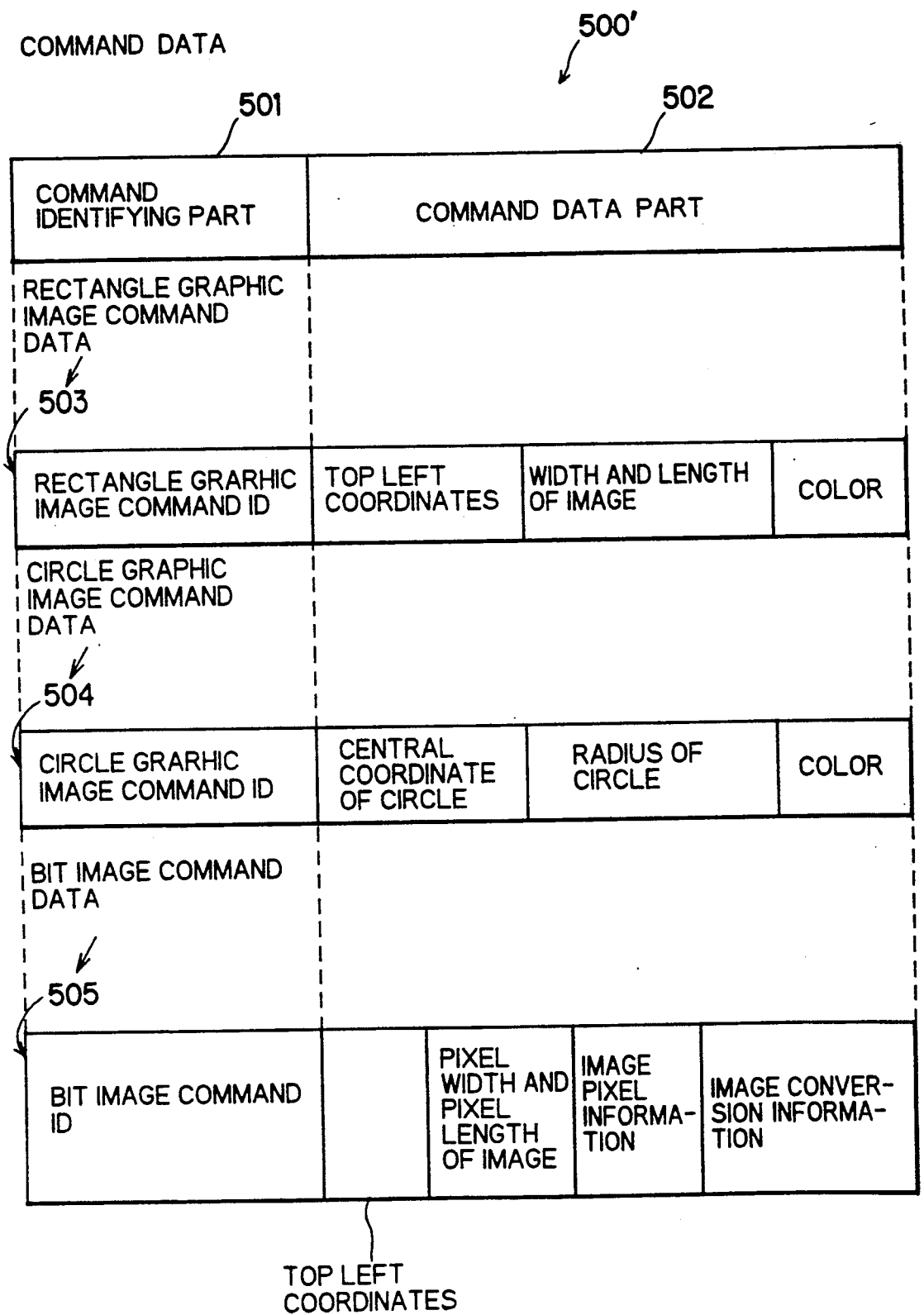
FIG. 23 is a diagrammatical view showing the structure of command data used in the second embodiment of the present invention.

An illustrative example of a group of command data used in this embodiment are shown in FIG. 23. The command data are the same as those in the first embodiment shown in FIG. 8 with the exception that a bit image command data 505 of this embodiment further includes image conversion information representing the image conversion process such as scaling (enlarging and reducing), and color conversion.

Figure 24:
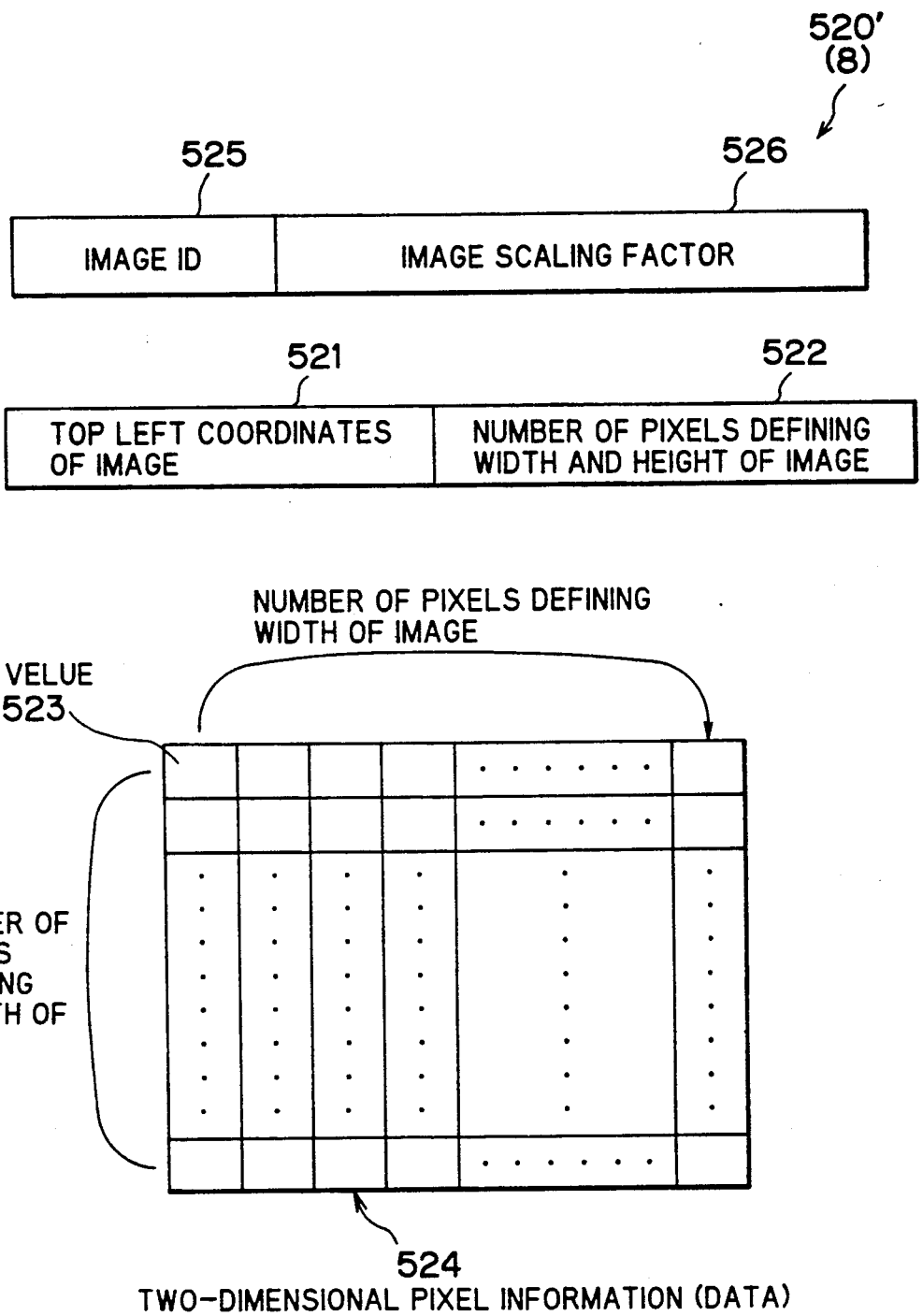
FIG. 24 is a diagrammatical view showing the structure of bit image information data used in the second embodiment of the present invention.

From the command data shown in FIG. 23, the line segment data 510 shown in FIG. 9 and the bit image information data 520' shown in FIG. 24 are produced. As is apparent from FIG. 24, the bit image information data 520' is similar to the bit image information data 520 shown in FIG. 10 but differs therefrom in that it contains image conversion information 526 such as a scaling factor (an enlargement ratio or a reduction ratio) of the image conversion process and color conversion rate.

In this embodiment, the graphic image command data (710, 711) are converted into the line segment data (714) in the same manner as the first embodiment shown in FIG. 11. On the other hand, the bit image command data in this embodiment is interpreted in a manner described below.

Figure 25:
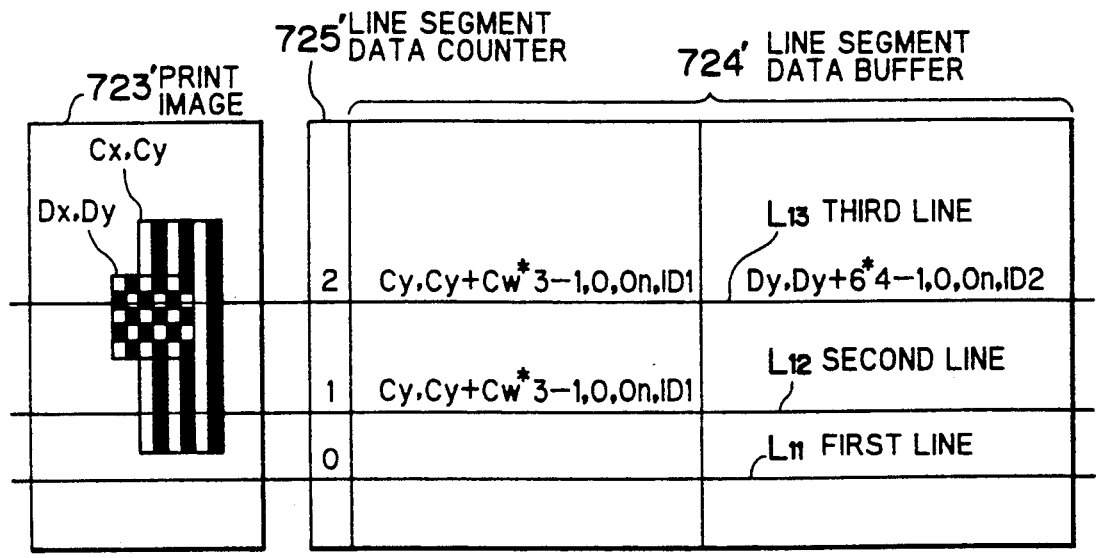
FIG. 25 is a diagrammatical view showing the manner in which the line segment data and the bit image information data are produced to be stored in the buffer based on the result of interpretation of examples of the bit image command data in the second embodiment of the present invention.
Figure 25:
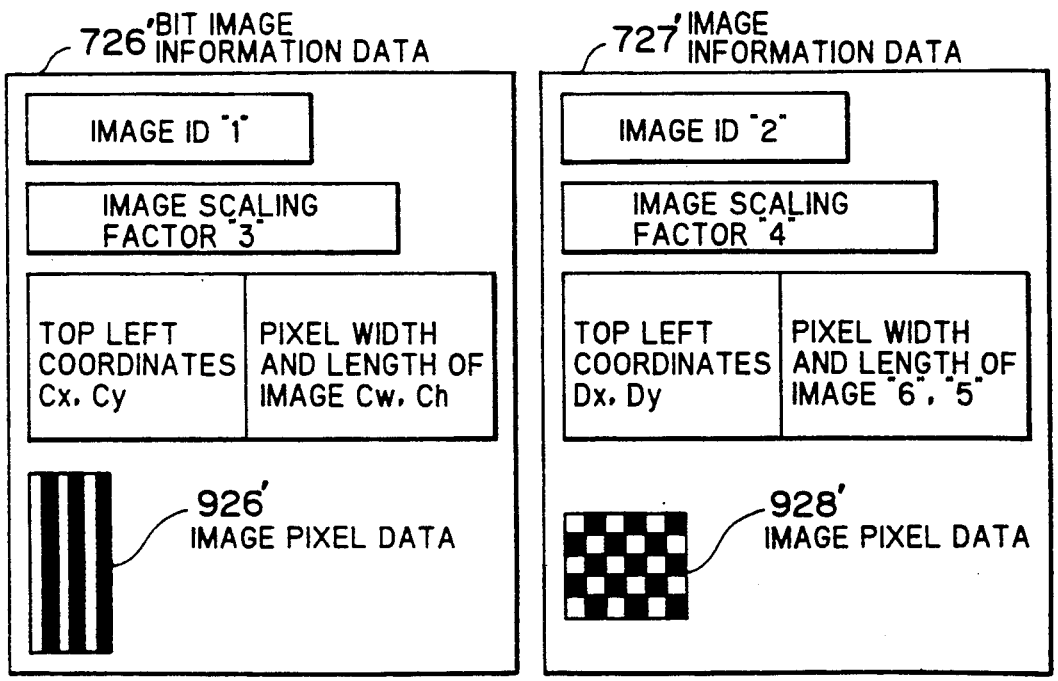

FIG. 25 is a diagrammatical view showing the manner in which concrete examples of the bit image command data 505 shown in FIG. 23 are developed into the line segment data and the bit image information data and are stored.

As shown in FIG. 25, now assume that a group of command data includes two bit image command data, namely a first command data 721' and a second command data 722'. The first command data 721' is an embodiment of the bit image command data 505 shown in FIG. 23 and contains command data to plot or draw a vertically striped image having top left coordinates Cx, Cy, a width Cw, a length Ch, and a magnification value of 3. The second command data 722' exemplifies the bit image command data 505 and contains command data to plot or draw a checker-patterned image having top left coordinates Dx, Dy, a pixel width of "6", length of "5" of the image, and a magnification value of 4. A print image to be formed by the first and second command data 721' and 722' is generally designated by 723'. The print image is composed of a vertically striped image drawn by the first command data 721' to have the top left coordinates Cx, Cy, and a checker-patterned image which is drawn over the vertically striped image by the second command data 722' to have the top left coordinates Dx, Dy.

A line segment data buffer 724' (515, 517) and a line segment data counter 725' constituting one item of the line data buffer management information (516, 518) represent a result of interpretation of the command data 721', 722'. Bit image information data 726' is also produced based on the first command data 721', while bit image formation data 727' is produced from the second command data 722'. The bit image information data 726' holds therein an image ID (a sequence of appearance of the bit image command data) of "1", coordinates Cx, Cy of an upper left corner of an image, a pixel width Cw and a pixel length Ch of the image, an image magnification value of 3, and image pixel data 926'. The bit image information data 727' holds therein an image ID "2", coordinates Dx, Dy of an upper left corner of an image, a pixel width "6" and a pixel height "5" of the image, an image magnification value of 4, and image pixel data 928'. The segment data to be stored in the line data buffer 724 includes a start point of a line segment image, an end point of the line segment image, a color of the line segment image ("0" in this case), an image flag of the image management information (which is turned on in this case), and image IDs.

A first line L11 shows a result of storage of the line segment data obtained where no bit image is to be plotted. The line segment data counter 725 of this first line L11 is therefore set to "0" and no line segment data is stored in the line segment data buffer 724'.

A second line L12 shows a result of storage of the line segment data obtained where plotting is to be done by the first command data 721'. The line segment data counter 725 of this second line L12 is therefore set to "1", and the line segment data buffer 724 stores therein line segment data representing a condition in which a start y-coordinate is Cy, an end y-coordinate is Cy+Cwx3−1, a color value is "0", an image flag is "ON", and an image ID is "1".

A third line L13 shows a result of storage of the line segment data obtained where plotting is to be done by the first and second command data 721' and 722'. The line segment data counter 725 of this third line L13 is therefore set to "2". The line segment data buffer 724 stores therein a first line segment data representing a condition in which a start y-coordinate is Cy, and end y-coordinate is Cy+Cwx3−1, a color value is "0", an image flag is "ON", and an image ID is "1". The line segment data buffer 724' further stores a second line segment data representing a condition in which a start y-coordinate is Dy, an end y-coordinate is Dy+6x4−1, a color value is "0", an image flag is "ON", and an image ID is "2".

When the line segment data 724' and the bit image information data 726', 727' are developed to the raster image data, the data structure shown in FIG. 16 is used in the same manner as the first embodiment. In addition, in the same manner as the first embodiment, one raster image data is produced according to the flowchart shown in FIG. 15. In the second embodiment, it should be noted, however, if judgment at the step S907 indicates the "ON" state of the image flag, the step S908 converts the bit image information data (726' or 727') into raster bit image data through an image conversion process based on scaling factors which constitute the image conversion information. Subsequently, among the raster bit image data, such a portion of raster bit image data which corresponds in position to an area represented by the position of the line segment data is developed to be written to the corresponding dots in the line buffer at a step S910.

Regarding the graphic image command data, in this embodiment, the line segment data generated as shown in FIG. 11 is developed to the line buffers as shown in FIG. 17 in the same manner as the first embodiment. On the other hand, regarding the bit image command data, the line segment data and the bit image information data are developed to the line buffers in a manner described below.

Figure 26:
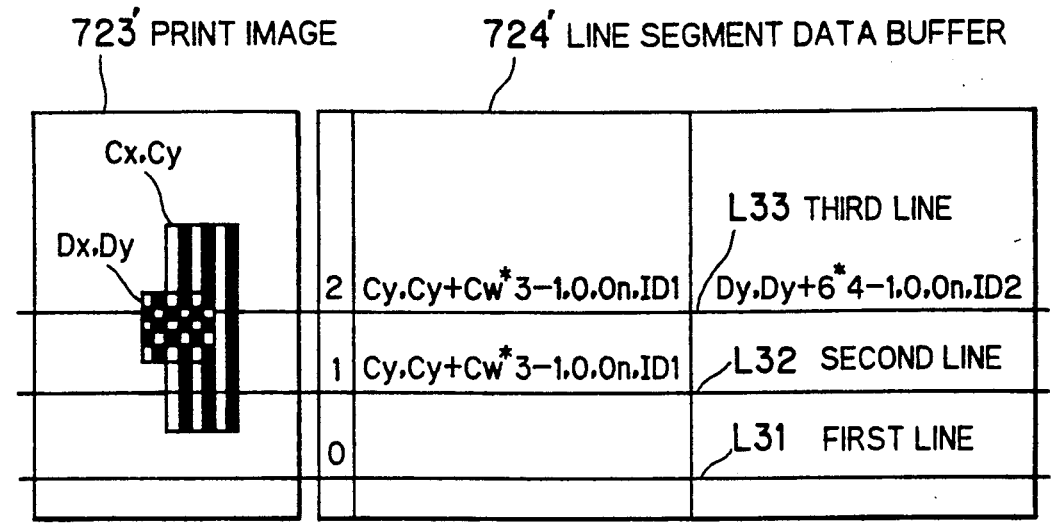
FIG. 26 is a diagrammatical view showing the manner in which the examples of the line segment data and the bit image information data are developed to the raster image data in the line buffers in the second embodiment of the present invention.

FIG. 26 is a diagrammatical view showing the manner in which the line segment data 724' and the bit image information data 726', 727' (FIG. 25) are developed to the line buffers.

A first line L31 shows a result of storage of the line buffer 923 obtained where no plotting is to be done.

A second line L32 shows a result of storage of the line buffer 924 obtained where plotting is to be done only by the first command data 721'. The 3-times enlarged raster bit image data 929' (raster bit image data 12) which is three-times as large as the image pixel data 926' contained in the image bit information data 726' is used, and according to the line segment data buffer 724', such a portion of the 3-times enlarged raster image data 929' which corresponds in position to the position represented by the line segment data 724' is written to an area of the line buffer 924' ranging between a y-coordinate Cy and a y-coordinate Cy+Cwx3−1.

A third line L33 shows a result of storage of the line buffer 925 obtained where plotting is to be done by the first and second command data 721' and 722'. The 4-times enlarged raster bit image data 931' (raster bit data 12) which is four-times as large as the image pixel data 928' contained in the bit image information data 727' is used, and according to the line segment data buffer 724', such a portion of the 4-times enlarged raster image data 931' which corresponds in position to the position represented by the line segment data 724' is written to a first area of the line buffer 925, ranging between a y-coordinate Dy and a y-coordinate Dy+6x4−1. In this instance, a part ranging from a y-coordinate of Cy to a y-coordinate of Dy+6x4−1 of a second area of the line buffer 925' which ranges between a y-coordinate Cy and a y-coordinate Cy+Cwx3−1 is occupied by the image pixel data 931'. Therefore using the 3-times enlarged raster bit image data 929' (raster bit image data 12) which is three-times as large as the image pixel information data 926' contained in the bit image information data 726', such a portion of the 3-times enlarged raster bit image data 929' which corresponds in position to the position represented by the line segment data 724' is written to the remainder of the second area of the line buffer 925' ranging between a y-coordinate Dy+6x4−1 and a y-coordinate Cy+Cwx3−1.

The bit image information data storing process illustrated in FIG. 25 and the line buffer developing process illustrated in FIG. 26 involve an image conversion process (enlarging, for example) which is applied directly to the original image pixel data (926', 928') (for example, an 8.2×12.7 mm-sized color photoprint picture). Such direct image conversion process requires less time and is able to cut processing time of the entire apparatus.

Scaling embodying the image conversion process in the second embodiment will be described below with reference to FIG. 27.

There is known a scaling process (enlargement and reduction of an original image) in which linear interpolation is used to produce a new pixel by interpolating the adjacent pixels of an original image.

Figure 27:
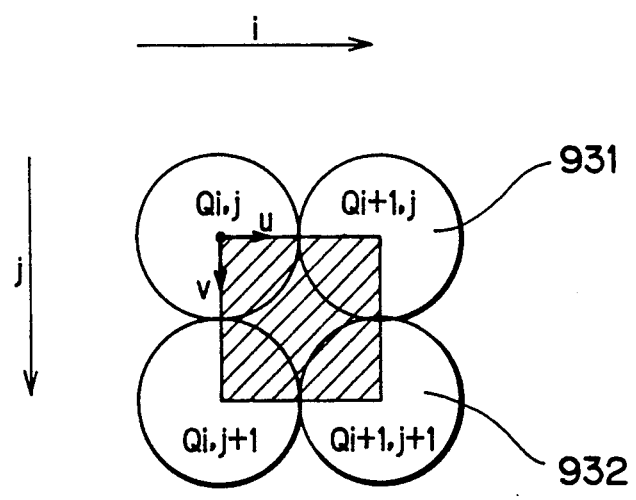
FIG. 27 is a diagrammatical view illustrative of a scaling operation achieved to enlarge or reduce the image size based on linear interpolation according to the second embodiment of the present invention.

As shown in FIG. 27, now assume that coordinates of four pixels (Qi,j; Qi+1,j; Qi,j+1; and Ql+1,j+1) of the original image which are arranged in vertical and horizontal juxtaposition are given as four control points 931. In this case, a square plane (Pi,j) 932 indicated by hatching is given by the following expression.

$$P_{i,j}(u,v) = u \, N_L \, Q \, N_L^T \, v^T$$

where $u = [u \; 1]$ $v = [v \; 1]$ $$N_L = \begin{bmatrix} -1 & 1 \\ 1 & 0 \end{bmatrix}$$

$$Q = \begin{bmatrix} Q_{i,j} & Q_{i,j+1} \\ Q_{i+1,j} & Q_{i+1,j+1} \end{bmatrix}$$

Since elements of the coefficient matrix $N_L$ consist of 0, 1 and −1, calculation of Pi,j cannot load the CPU severely. Substituting any real number for u and v where $0 \leq u \leq 1$ and $0 \leq v \leq 1$, we have a different number of pixels on the plane (Pi,j) 932. For instance, a 7-times enlargement of the original image in vertical and horizontal directions is desired, the u, v values are substituted by 0.0, 0.143, 0.286, 0.429, 0.571, 0.714 and 0.857. Then, calculating from the above-specified expression, we have a total of 49 sets of pixel coordinates.

Items of the image conversion information provided with the bit image command data with which the image converting means of the present embodiment performs the image conversion process are not limited to the scaling factor or a color conversion rate. Rather, other items of information related to color reversing, mirroring, and image rotation can be used.

The printer used in the preferred embodiments of the invention may be replaced by a thermoelectric printer or a video display unit provided that a raster scanning system is employed. Further, the hard disk drive may be substituted by a magnetooptic disk unit, a floppy disk or a tape drive unit.

As apparent from the above description, the print control apparatus according to the present invention has the following various advantages.

Instead of directly developing the command data, the print control apparatus of this invention first converts the command data to the line segment data having information on a position and a length in a raster direction (a direction parallel to horizontal scanning lines), then performing a printing operation while successively developing the line segment data into the raster image data. The print control apparatus thus constructed does not require a large capacity of memory having a full-page capacity for storing the raster image for one-page of print output, but requires only a small capacity of memory for storing the line segment data of small amount and the raster image data for one raster. Accordingly, the print control apparatus is manufactured at a low cost, and also is able to provide a fine and high-quality printout in less time.

Further, conversion to raster image data effected on an overlapping portion of two or more images can be accomplished at only one time and, hence, a high-speed data processing is possible.

In addition, the size of the line segment data group is converted to an integral multiple of the sector size of the external storage unit (hard disk) before when the line segment data group is transferred to the external storage unit. Such a data size conversion offers a high speed access to the external storage unit and maximizes the data transfer rate. As the external storage unit, not only the hard disk drive 309 but also a floppy disk, a magnetooptic disk and a DAT can be used. To summerize, a storage unit which has a plurality of sectors having a predetermined sector size and which can perform random access operation to a desired sector may be used as the external storage unit.

After a printing operation, the line segment data and the bit image information data are transferred to the external storage unit (which is formed of a non-volatile memory such as a hard disk), as a print restart preparation process. Accordingly, it is possible to reproduce one page of print output at any time. This process is performed in parallel with a return stroke of the printing mechanism and hence does not overlap the raster image data developing process.

According to the invention, the graphic image command data is converted to line segment data which requires less capacity of storage. Furthermore, image information of the bit image command data is converted to the bit image information data, and position information of the bit image command data is converted to the line segment data. The bit image information data and the line segment data require memory of small storage capacity. The raster image data is generated while the line segment data and the bit image information data are developed successively on the raster bases. With this arrangement, a great amount of reduction in the memory capacity can be attained. Accordingly, it becomes possible to provide a raster image data generating device which can generate the raster image data representative of a large-sized image of high quality at a low cost.

The bit image information data may be subjected to the image conversion process such as image enlarging process before being converted into the raster image data. In this case, the time required for the image conversion process can be greatly reduced.

Obviously, various minor changes and modifications of the present invention are possible in the light of the above teaching. It is therefore to be understood that within the scope of the appended claims the invention may be practiced otherwise than as specifically described.

What is claimed is:

1. A print control apparatus for converting command data representative of at least one desired image to be printed by a printer device onto one page of print output into raster image data representative of color density data to be printed on respective ones of plurality of rasters in the one page of print output, said print control apparatus comprising:

input means for receiving command data representative of at least one desired image to be printed by a printer device onto one page of print output;

line segment data conversion means for converting the command data into at least one line segment data allotted for each raster of a plurality of rasters in the print output, each of the at least one line segment data representing a line segment image of a single color distribution extending in the corresponding raster and bearing information on a position and a length, in a direction in which the corresponding raster extends, of the line segment image and the single color distribution state of the line segment image;

raster image data conversion means for converting the at least one line segment data to a raster image data representative of color density data to be printed on the corresponding raster in the one page of print output; and output means for outputting the raster image data for respective one of the plurality of rasters to a printer device one by one, to thereby allow the printer device to print the plurality of rasters one by one and produce the one page of print output.

2. A print control apparatus according to claim 1, further comprising:

line segment data storage means for temporarily storing the at least one line segment data for all of the plurality of rasters in the print output before when said raster image data conversion means converts the at least one line segment data for respective one of the plurality of rasters one by one.

3. A print control apparatus according to claim 2, further comprising:

raster image data storage means for temporarily storing the raster image data for one of the plurality of rasters before when said output means outputs the raster image data one by one to the printer device.

4. A print control apparatus according to claim 1, wherein said raster image data conversion means includes:

overlap judging means for judging whether or not at least two line segment data obtained for a single raster indicate that the at least two line segment images represented thereby are partly overlapped with each other; and conversion selection means for selectively converting, into the raster image data, a single one of the at least two line segment data representative of one of the corresponding at least two line segment images which is overlapped on remaining ones of the at least two line segment images.

5. A print control apparatus according to claim 1, wherein said raster image conversion means includes:

judge means for judging the information on the position and the length in the raster extending direction of each of the at least one line segment data allotted for each raster to thereby determine which one of the line segment images represented by the line segment data occupies each point on the corresponding raster; and conversion means for converting the line segment data representative of the line segment image occupying the corresponding point in the corresponding raster into the raster image data for the corresponding point in the corresponding raster.

6. A print control apparatus according to claim 5, wherein said judge means includes overlapping judging means for judging whether or not at least two line segment images represented by at least two line segment data occupy the corresponding point on the corresponding raster, and wherein said conversion means includes conversion selection means for converting only a single one of the at least two line segment data representative of one of the corresponding at least two line segment images which is overlapped on remaining ones of the at least two line segment images at the corresponding point in the corresponding raster into the raster image data for the corresponding point in the corresponding raster.

7. A print control apparatus according to claim 2, wherein said input means includes receiving means for receiving a plurality of command data representative of a plurality of images to be printed by the printer device onto one page of print output one by one in a command data receiving order so that an image represented by a latterly inputted command data may be overlapped on an image represented by a priorly inputted command data in the print output, wherein said line segment data storage means includes storing means for storing the line segment data produced based on respective ones of the plurality of command data in an order corresponding to the command data receiving order, wherein said raster image data conversion means includes converting means for converting the line segment data into the raster image data one by one in an order opposite to the command data receiving order, the converting means including:

an overlap judging part for judging whether or not at least two line segment data obtained from the at least two command data indicate that the at least two line segment images represented thereby are partly overlapped with each other; and a conversion selection part for selectively converting, into the raster image data, a single one of the at least two line segment data which is obtained from one of the corresponding at least two command data which has been inputted latest in the receiving means among the corresponding at least two command data.

8. A print control apparatus according to claim 2, wherein said line segment data storage means includes: line segment data dividing means for dividing a plurality of line segment data produced by said line segment data conversion means into a first group consisting of at least one of the plurality of line segment data and a second group consisting of remaining at least one of the plurality of line segment data;

a first storage unit for storing the first group of the line segment data;

a second storage unit for storing the second group of the line segment data, said second storage unit having at least one sector for storing therein the second group of the line segment data, each of the at least one sector having a predetermined sector size; and data size conversion means for converting size of the second group of the line segment data into an integral multiple of the predetermined sector size before when the second group of the line segment data is stored in said second storage unit.

9. A print control apparatus according to claim 2, further comprising printer status input means for receiving a signal indicative of a status of the printer device, wherein said line segment data storage means includes:

first line segment data storage means for temporarily storing the line segment data for respective ones of the plurality of rasters on the print output until when said printer status input means receives the signal;

second line segment data storage means for temporarily storing the line segment data for the respective ones of the plurality of rasters on the print output after when said printer status input means receives the signal; and transfer means for transferring the line segment data for the respective ones of the plurality of rasters on the print output from said first line segment data storage means toward said second line segment data storage means at the time when said printer status input means receives the signal.

10. A print control apparatus according to claim 9, wherein said printer status input means receives a signal indicative of stop of a printing operation of the printer device, and wherein said first line segment data storage means includes a volatile memory and said second line segment data storage means includes a non-volatile memory.

11. A print control apparatus for converting command data representative of at least one desired images to be printed by a printer device onto one page of print output into raster image data representative of color density data to be printed on respective ones of a plurality of rasters in the one page of print output, said print control apparatus comprising:

input means for receiving command data representative of at least one desired images to be printed by a printer device onto one page of print output;

command data kind judging means for judging whether the command data received by said input means is either one of a graphic image command data representative of a graphic image where color is distributed in a single manner and a bit image command data representative of a bit image where a plurality of color pixels representative of various colors are distributed, the graphic image command data bearing an information on the single manner in which the color is distributed and the bit image command data bearing an information on the state how the plurality of color pixels are distributed;

first conversion means for converting the graphic image command data into at least one first line segment data allotted for each raster of a plurality of rasters in the print output, each of the at least one first line segment data representing a first line segment image where color is distributed in the single manner, the first line segment image extending in the corresponding raster, the first line segment data bearing information on a position and a length, in a direction in which the corresponding raster extends, of the first line segment image and the single manner in which color is distributed in the first line segment image;

second conversion means for converting the bit image command data into a bit image information data bearing information on the state how the color pixels are distributed in the bit image and at least one second line segment data allotted for each raster of a plurality of rasters in the print output, each of the at least one second line segment data representing a second line segment image where the plural color pixels are distributed in the state represented by the bit image information data, the second line segment image extending in the corresponding raster, the second line segment data bearing information on a position and a length, in a direction in which the corresponding raster extends, of the second line segment image, the second line segment data and the bit image information data serving, in cooperation, to represent the second line segment image;

raster image data conversion means for the first line segment data for each raster to produce a first raster image data and processing the second line segment data for the corresponding raster and the bit image information data to thereby produce a second raster image data, combining the first raster image data and the second raster image data into a raster image data for the corresponding raster which represents a color density data to be printed on the corresponding raster in the one page of print output: and output means for outputting the raster image data for respective one of the plurality of rasters to a printer device one by one, to thereby allow the printer device to print the plurality of rasters one by one and produce the one page of print output.

12. A print control apparatus according to claim 11, further comprising:

line segment data storage means for temporarily storing the first and second line segment data for all of the plurality of rasters in the print output before when said raster image data conversion means processes the first and second line segment data for respective one of the plurality of rasters one by one; and bit image information data temporarily storing the bit image information data before when said raster image data conversion means processes the bit image information data.

13. A print control apparatus according to claim 12, further comprising:

bit image converting means for subjecting the bit image information data to an image conversion process to thereby produce a bit image data, wherein said raster image conversion means processes the second line segment data and the bit image data for converting the second line segment data and the bit image data to the second raster image data.

14. A print control apparatus according to claim 13, wherein the bit image command data received by said input means includes information on the image conversion process, wherein said second conversion means produces the bit image information data having the information on the image conversion process, and wherein said bit image converting means subjects the bit image information data to the image conversion process corresponding to the information on the image conversion process.

15. A print system for printing at least one desired image on one page of print output, comprising:

command data producing means for producing command data representative of at least one desired image to be printed onto one page of print output;

command data processing means for processing the command data into raster image data representative of color density data to be printed on respective one of a plurality of rasters in the one page of print output; and printing means for printing respective one of a plurality of rasters in the one page of print output based on the raster image data, wherein said command data processing means includes:

line segment data conversion means for converting the command data into at least one line segment data allotted for each raster of a plurality of rasters in the print output, each of the at least one line segment data representing a line segment image of a single color distribution which extends in the corresponding raster and bearing information on a position and a length, in a direction in which the corresponding raster extends, of the line segment image and the single color distribution of the line segment image; and raster image data conversion means for converting the at least one line segment data to the raster image data.

* * * * *